United States Patent
Yoshida et al.

(10) Patent No.: US 7,426,564 B2
(45) Date of Patent: Sep. 16, 2008

(54) COMMUNICATION CONTROL APPARATUS TRANSMITTING A COMMUNICATION PARAMETER TO FIRST AND SECOND COMMUNICATION APPARATUSES TO ENABLE THEM TO COMMUNICATE WITH EACH OTHER, FILE TRANSFER SYSTEM AND CONTROL METHOD FOR COMMUNICATION CONTROL APPARATUS

(75) Inventors: Masashi Yoshida, Kawasaki (JP); Masanori Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 11/199,104

(22) Filed: Aug. 8, 2005

(65) Prior Publication Data
US 2006/0033812 A1    Feb. 16, 2006

(30) Foreign Application Priority Data
Aug. 10, 2004    (JP)    ............... 2004-233748

(51) Int. Cl.
*G06F 13/00*    (2006.01)
(52) U.S. Cl. .................. 709/228; 709/237; 709/250
(58) Field of Classification Search ........... 709/217, 709/223, 224, 227, 228, 229, 250, 230, 237
See application file for complete search history.

(56) References Cited

U.S. PATENT DOCUMENTS

| | | | |
|---|---|---|---|
| 6,563,596 B1 * | 5/2003 | Narushima | 358/1.14 |
| 6,771,896 B2 * | 8/2004 | Tamura et al. | 396/57 |
| 7,200,685 B2 * | 4/2007 | Uemura | 710/2 |
| 2001/0043731 A1 * | 11/2001 | Ito et al. | 382/132 |
| 2002/0033965 A1 * | 3/2002 | Winter et al. | 358/1.15 |
| 2004/0212822 A1 * | 10/2004 | Schinner | 358/1.15 |
| 2004/0223060 A1 * | 11/2004 | Yasuda | 348/207.1 |
| 2005/0007617 A1 * | 1/2005 | Tanaka et al. | 358/1.13 |
| 2006/0206592 A1 * | 9/2006 | Fujii et al. | 709/220 |

FOREIGN PATENT DOCUMENTS

JP    2002-359623    12/2002

* cited by examiner

*Primary Examiner*—Viet Vu
(74) *Attorney, Agent, or Firm*—Cowan, Liebowitz & Latman, P.C.

(57) ABSTRACT

The invention realizes a simple and easy file transfer system by setting a communication parameter without requiring a manual input by a user and transferring a parameter indicating a file transfer job.

A third communication equipment transmits a communication parameter for executing a data communication between a first communication equipment and a second communication equipment, to the first communication equipment, and in response to the transmission of the communication parameter, receives a parameter indicating a file transfer job for transmitting files to the second communication from the first communication equipment, from the first communication equipment, and transmits the parameter indicating the file transfer job and the communication parameter to the second communication equipment.

8 Claims, 24 Drawing Sheets

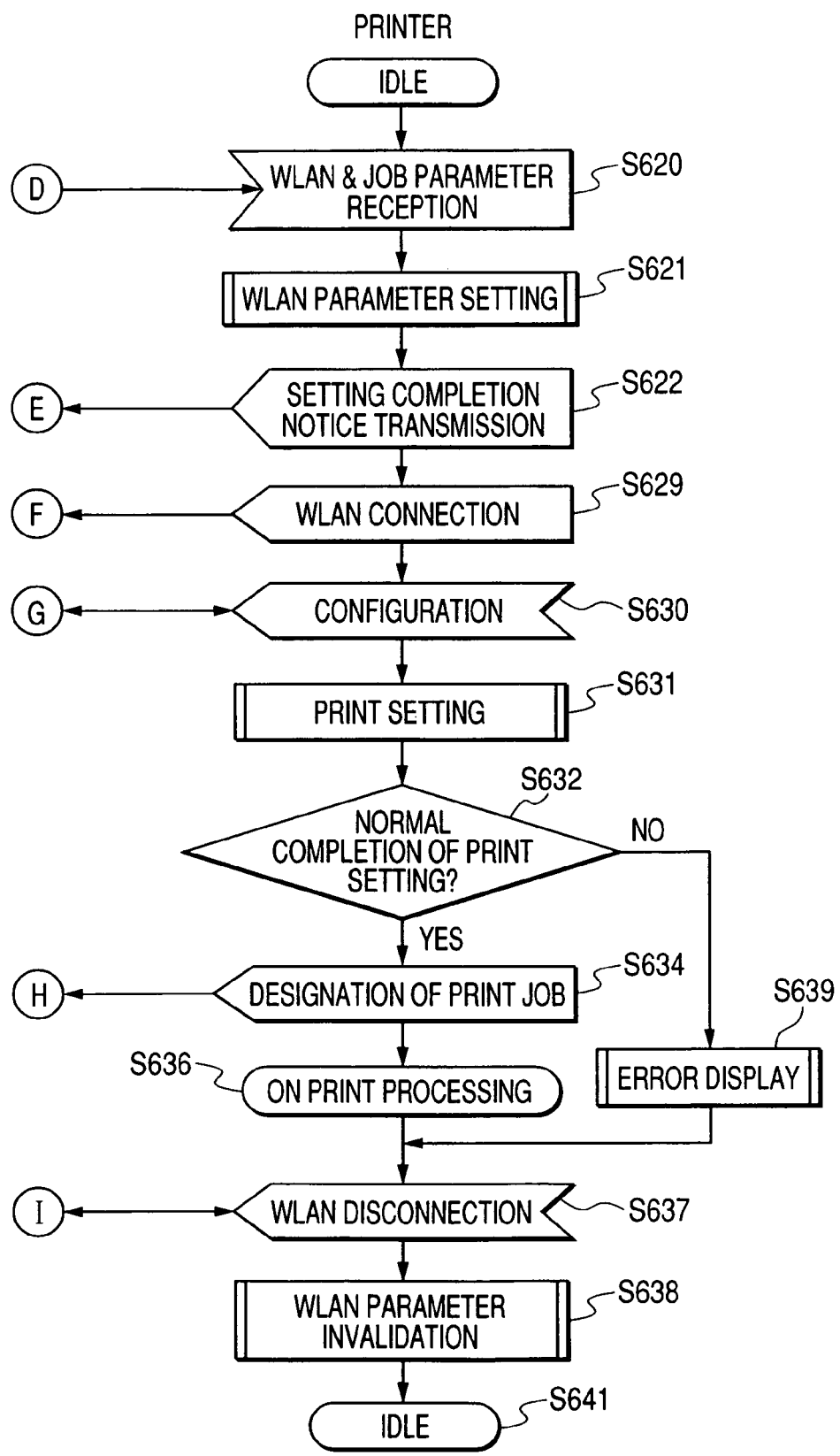

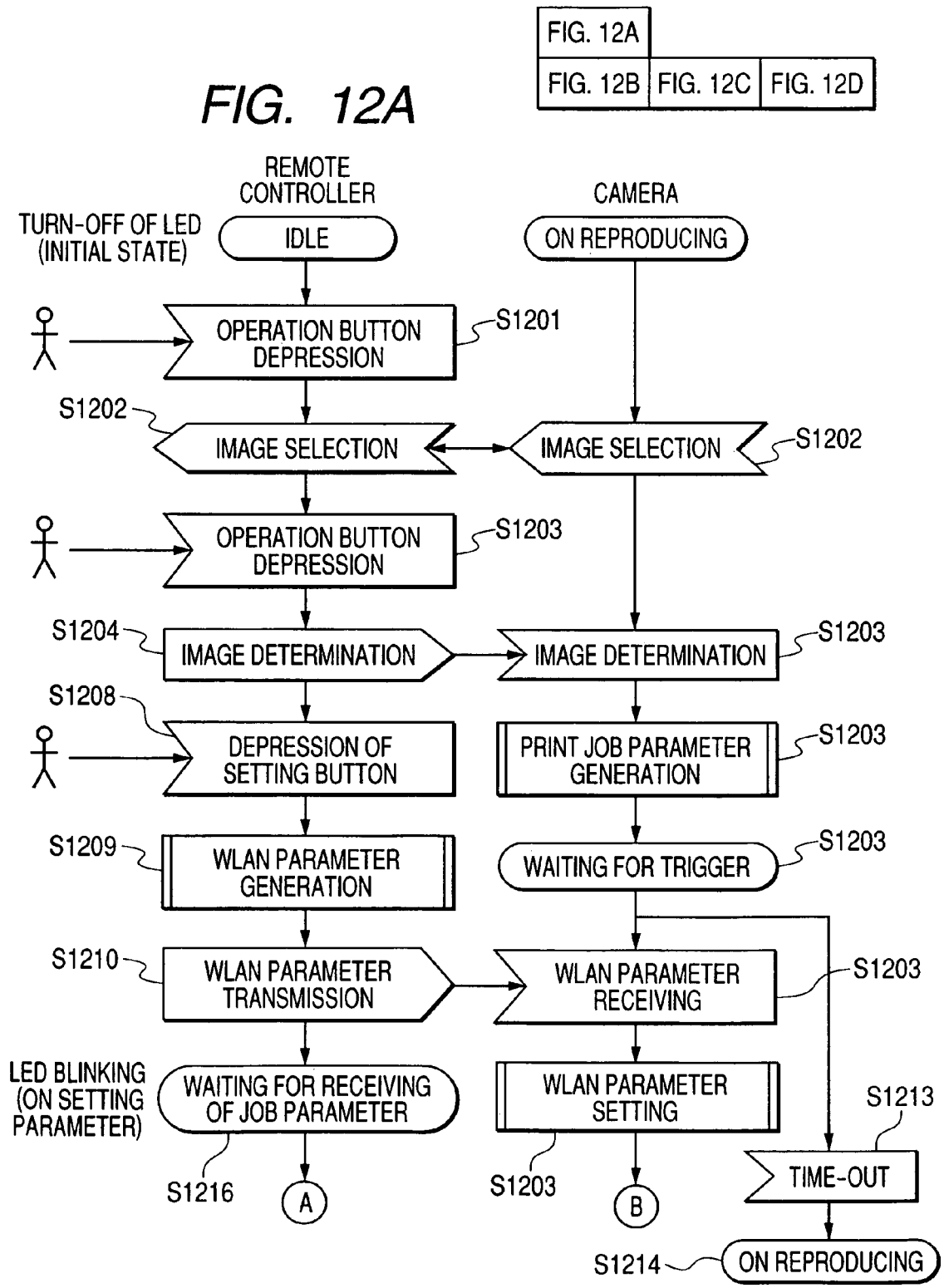

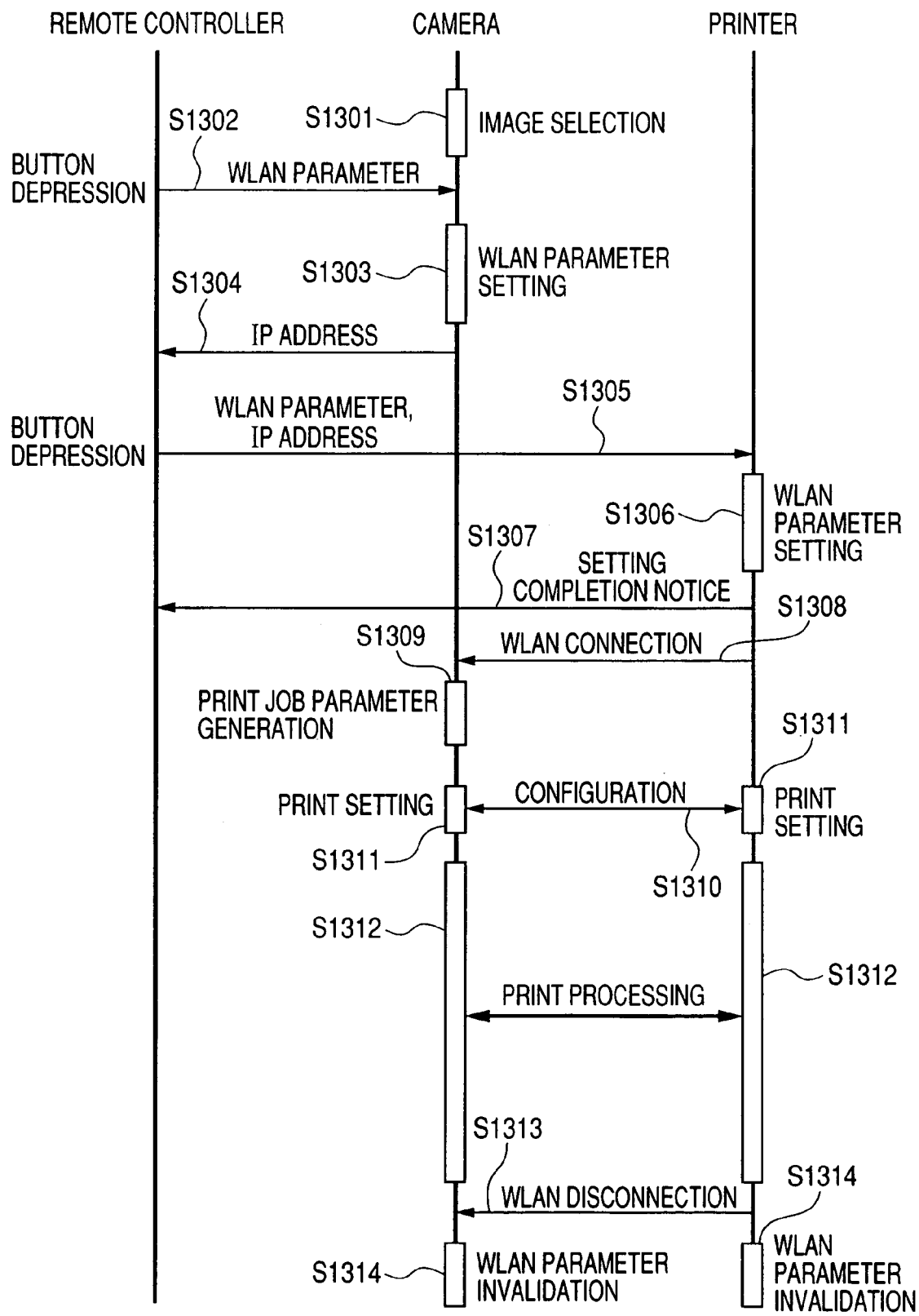

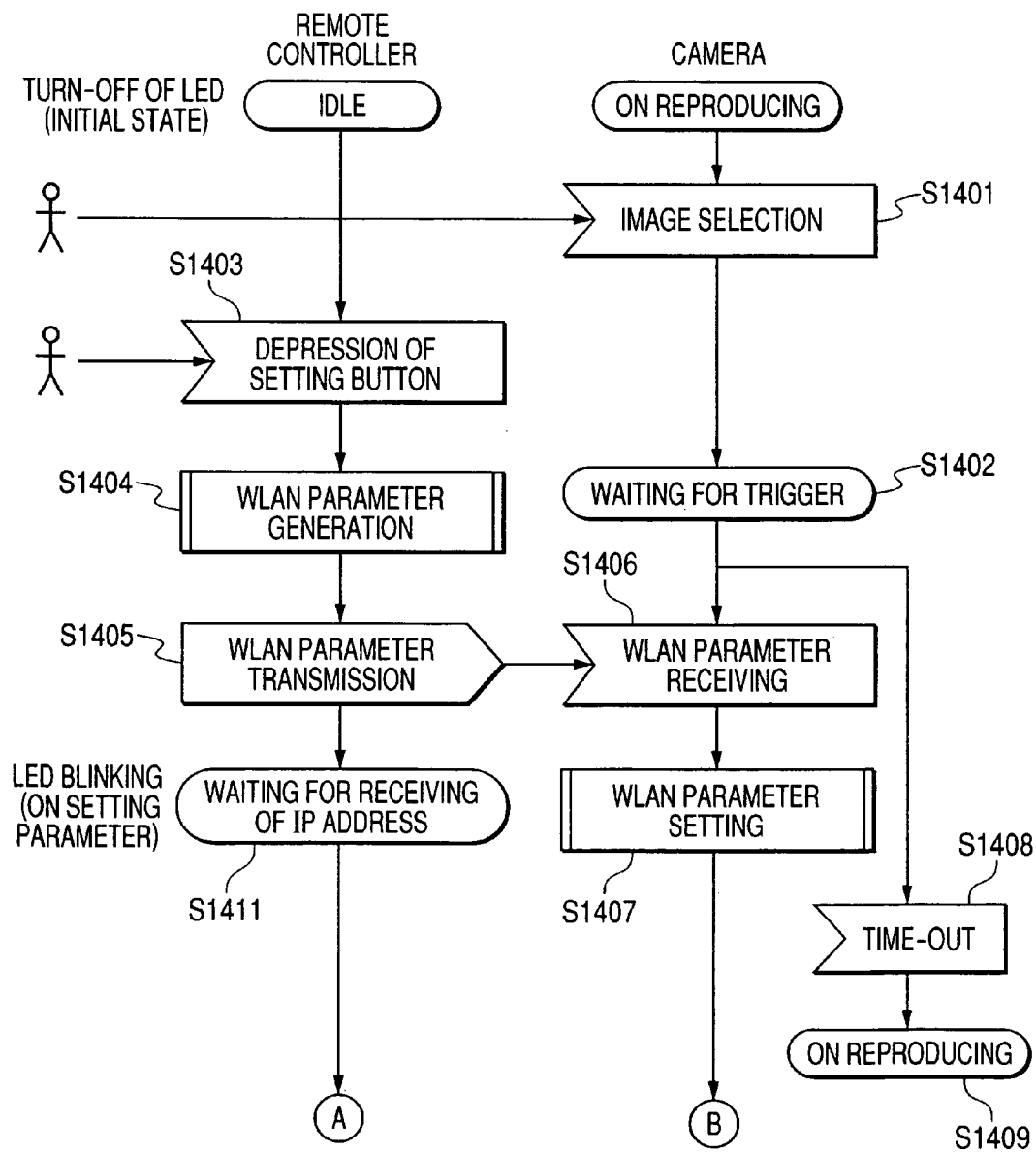

COMMUNICATION CONTROL APPARATUS TRANSMITTING A COMMUNICATION PARAMETER TO FIRST AND SECOND COMMUNICATION APPARATUSES TO ENABLE THEM TO COMMUNICATE WITH EACH OTHER, FILE TRANSFER SYSTEM AND CONTROL METHOD FOR COMMUNICATION CONTROL APPARATUS

BACKGROUND OF THE INVENTION

1. Field of the Invention

The present invention relates to a technology capable of setting wireless parameters and file transfer job parameters using a setting terminal, for example.

2. Related Background Art

A wireless communication requires a setting of wireless parameters, and, for such setting, there are known a method by a manual user input, and, in an equipment with limited UI such as an incorporated equipment, a method of generating wireless parameters using a PC setting tool and setting such parameters in the incorporated equipment through a wired cable such as USB. Also there is realized a system which is arranged, by simultaneous depressions of setting buttons of two equipment executing the wireless setting, to shift to a special setting mode for executing the setting of the wireless parameters.

Also Japanese Patent Application Laid-open No. 2002-359623 proposes a method of setting communication parameters of wireless communication means by wired communication means.

However, though the setting of the wireless parameters by a manual user input is acceptable in an equipment which enables a relatively easy input operation of the user such as a PC, it is difficult to set various wireless parameters by the manual input of the user in an equipment having less UI such as an incorporated equipment.

Also the prior technology of transferring the wireless parameters of wireless communication means through wired communication means, as disclosed in Japanese Patent Application Laid-open No. 2002-359623, always requires a wired cable for setting the wireless parameters and is associated with a drawback of deteriorating the convenience of the user. Also it is required that either of the equipment already has wireless setting, and, in case such equipment with set wireless parameters is not available, it is necessary to set the wireless parameters on either equipment for example by a manual input, thereby resulting a drawback of deteriorating the convenience of the user.

SUMMARY OF THE INVENTION

An aspect of the present invention is to solve all or at least one of the aforementioned drawbacks.

An object of the present invention is to set communication parameters without requiring a particular manual input to the user and to transfer a parameter indicating a file transfer job at such setting, thereby realizing a simple and easy file transfer system.

In an aspect of the present invention, a communication apparatus of the present invention includes first transmission means which transmits a communication parameter for executing a data communication between a first communication apparatus and a second communication apparatus, to the first communication apparatus, reception means which receives, from the first communication apparatus, a parameter indicating a file transfer job for transmitting files to the second communication apparatus from the first communication apparatus, in response to a transmission of the communication parameter by the first transmission means, and second transmission means which transmits, to the second communication apparatus, the parameter indicating the file transfer job received by the reception means and the communication parameter.

Other objects of the present invention, and features thereof, will become fully apparent from the following description of embodiments, which is to be taken on conjunction with the accompanying drawings.

BRIEF DESCRIPTION OF THE DRAWINGS

FIG. 13 is a view showing a process sequence of a fourth embodiment; and

DETAILED DESCRIPTION OF THE PREFERRED EMBODIMENTS

In the following, preferred embodiments of the present invention will be explained with reference to the accompanying drawings.

First Embodiment

Figure 1:
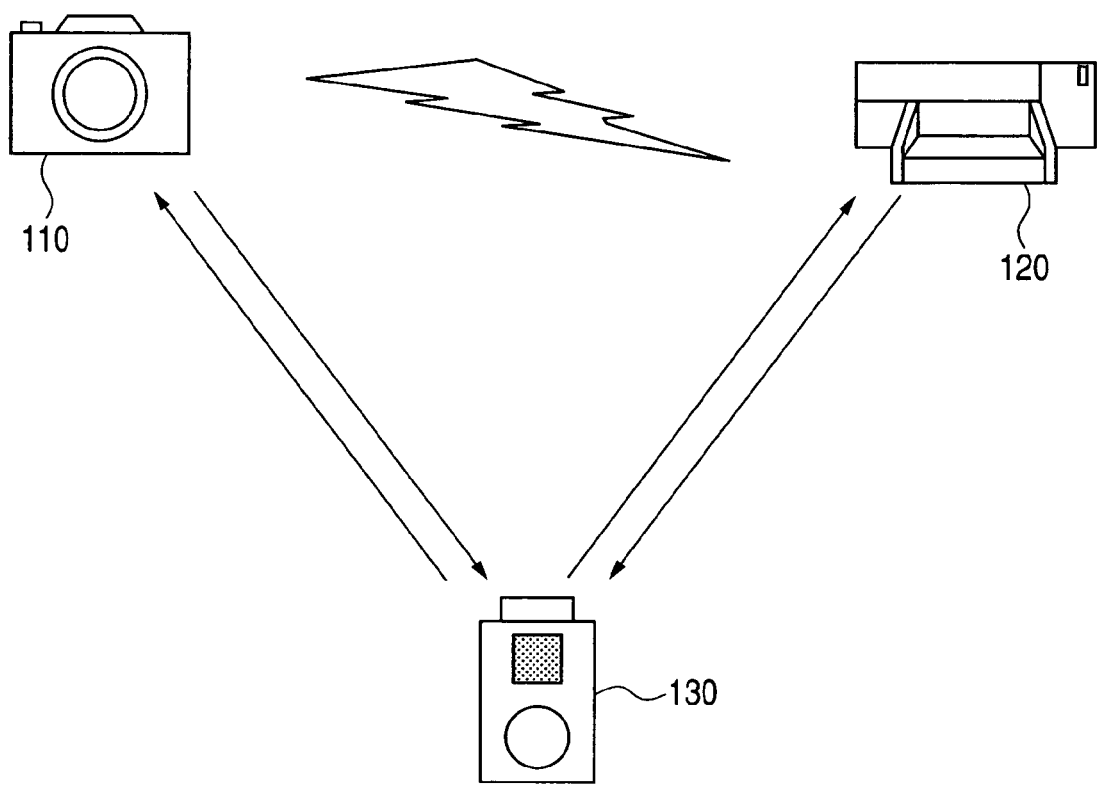
FIG. 1 is a schematic view showing a system configuration in an embodiment of the present invention.

FIG. 1 is a schematic view showing a system configuration of a first embodiment. A first communication equipment 110 is capable of storing image data in storage means in the equipment and is provided with wireless communication means, and, in the present embodiment, a digital camera is taken as an example of the first communication equipment. A second communication equipment 120 has a function of printing an image and is provided with wireless communication means, and, in the present embodiment, a printer is taken as an example of the second communication equipment. A third communication equipment 130 is a setting terminal for setting wireless parameters, and, in the present embodiment, a remote control or a cellular phone with an infrared communication function is taken as an example of the third communication equipment.

Figure 2:
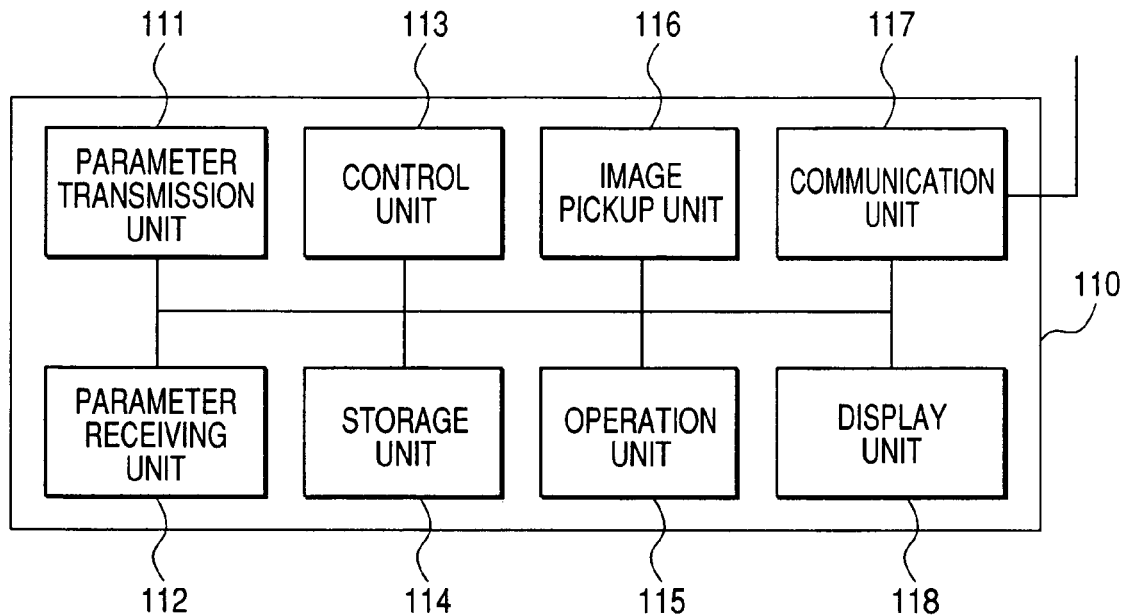
FIG. 2 is a view showing a configuration of a first communication equipment in an embodiment of the present invention.

FIG. 2 is a view showing the configuration of the digital camera constituting the first communication equipment 110 and realizing the present embodiment, and it is constituted of a parameter transmission unit 111 and a parameter reception unit 112 for executing transmission/reception of various parameters to/from the third communication equipment 130 by the first communication means, a control unit 113 for controlling the entire equipment, a storage unit 114 for storing image data, an image pickup unit 116 for executing an image pickup by a user operation on an operation unit 115, a display unit 118 for displaying an image, and a communication unit 117 for executing a communication with the second communication equipment by the second communication means.

Figure 3:
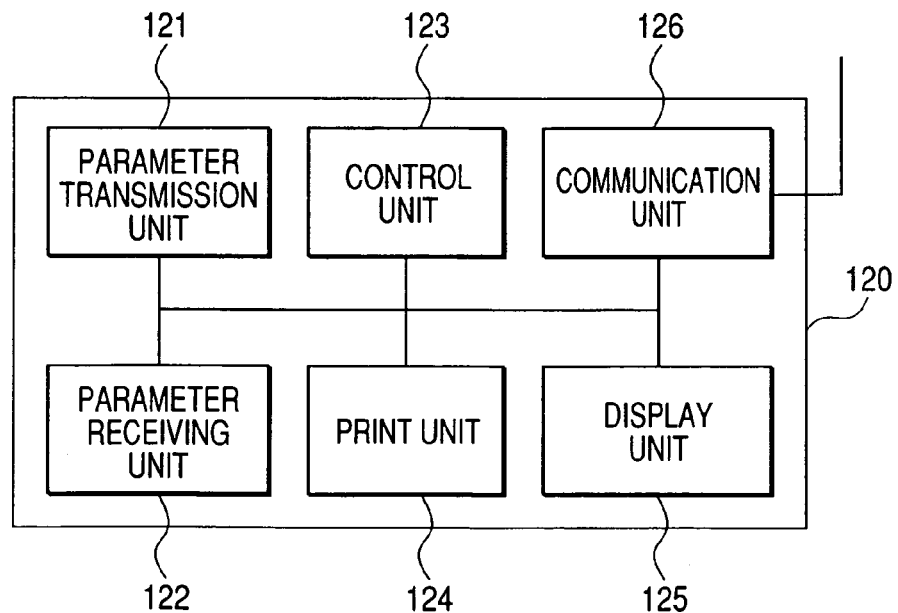
FIG. 3 is a view showing a configuration of a second communication equipment in an embodiment of the present invention.

FIG. 3 is a view showing the configuration of the printer constituting the second communication equipment 120 and realizing the present embodiment, and it is constituted of a parameter transmission unit 121 and a parameter reception unit 122 for executing transmission/reception of various parameters to/from the third communication equipment 130 by the first communication means, a control unit 123 for controlling the entire equipment, a printing unit 124 for printing the image data obtained from the digital camera 110, a display unit 125, and a communication unit 126 for executing a communication with the digital camera 110 by the second communication means.

Figure 4:
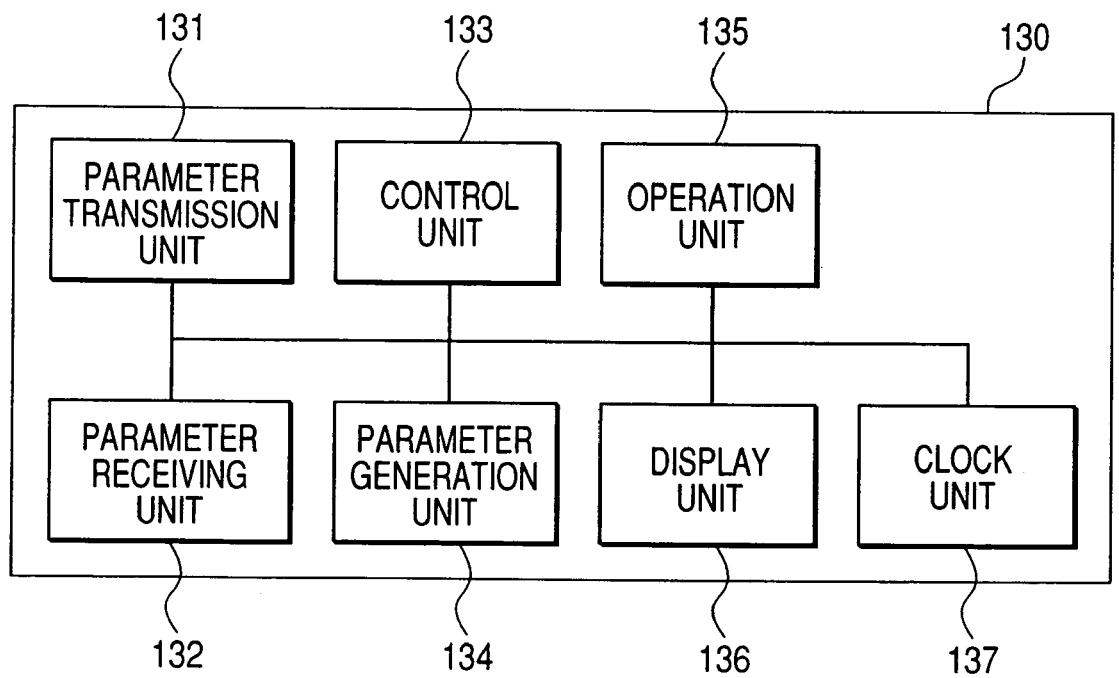
FIG. 4 is a view showing a configuration of a third communication equipment in an embodiment of the present invention.

FIG. 4 is a view showing the configuration of the setting terminal (portable terminal such as a remote control or a cellular phone) constituting the third communication equipment 130 and realizing the present embodiment, and it is constituted of a parameter transmission unit 131 and a parameter reception unit 132 for executing transmission/reception of various parameters to/from the digital camera 110 and the printer 120 by the first communication means, a control unit 133 for controlling the entire equipment, a parameter generation unit 134 for generating wireless parameters, an operation unit 135, a clock unit 137, and a display unit 136 for displaying a system status.

Figure 5:
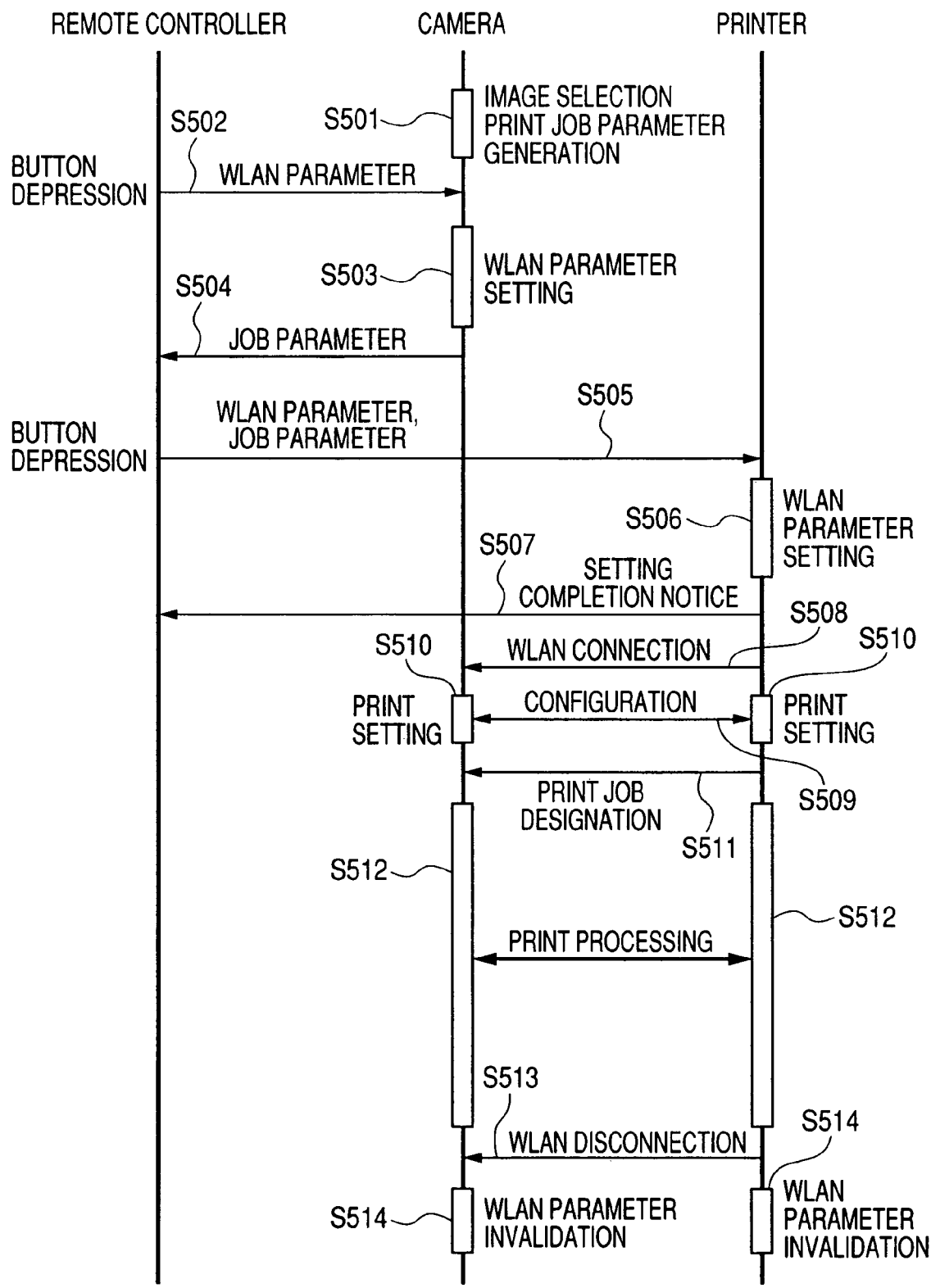
FIG. 5 is a view showing a process sequence of a first embodiment of the present invention.
Figure 6A:
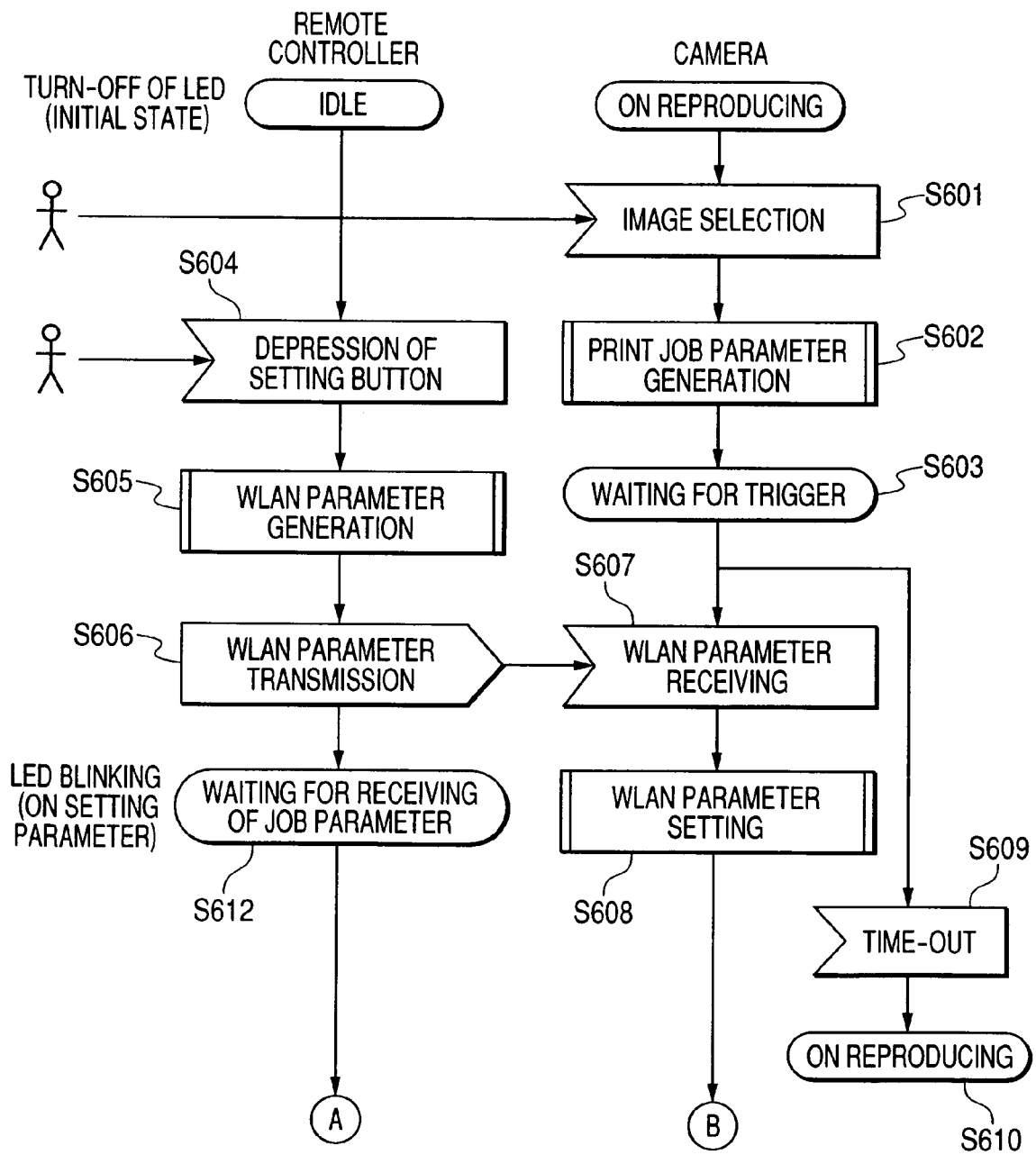
FIG. 6 which is composed of FIGS. 6A, 6B, 6C and 6D are views showing a state transition in the first embodiment.
Figure 6B:
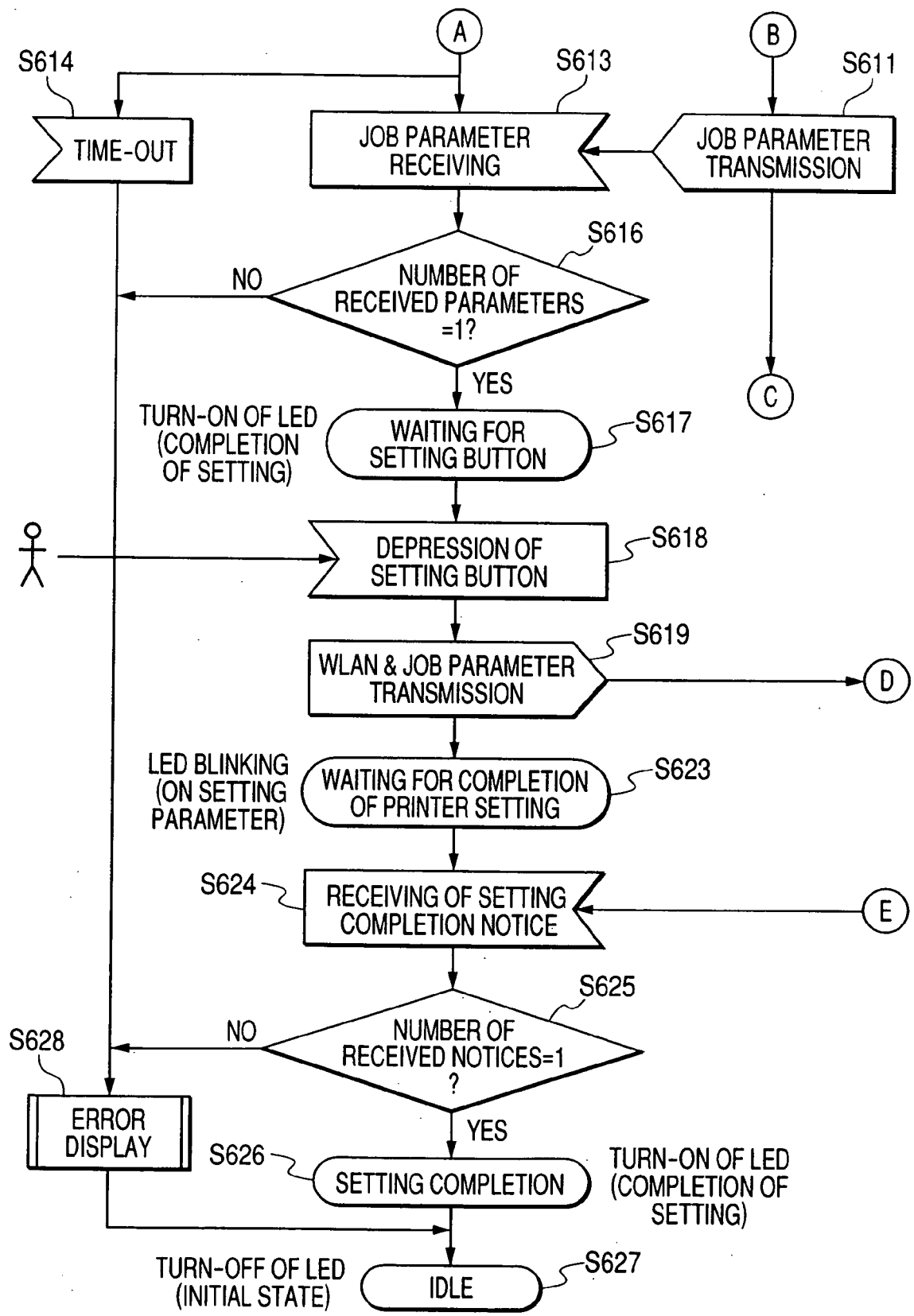
Figure 6C:
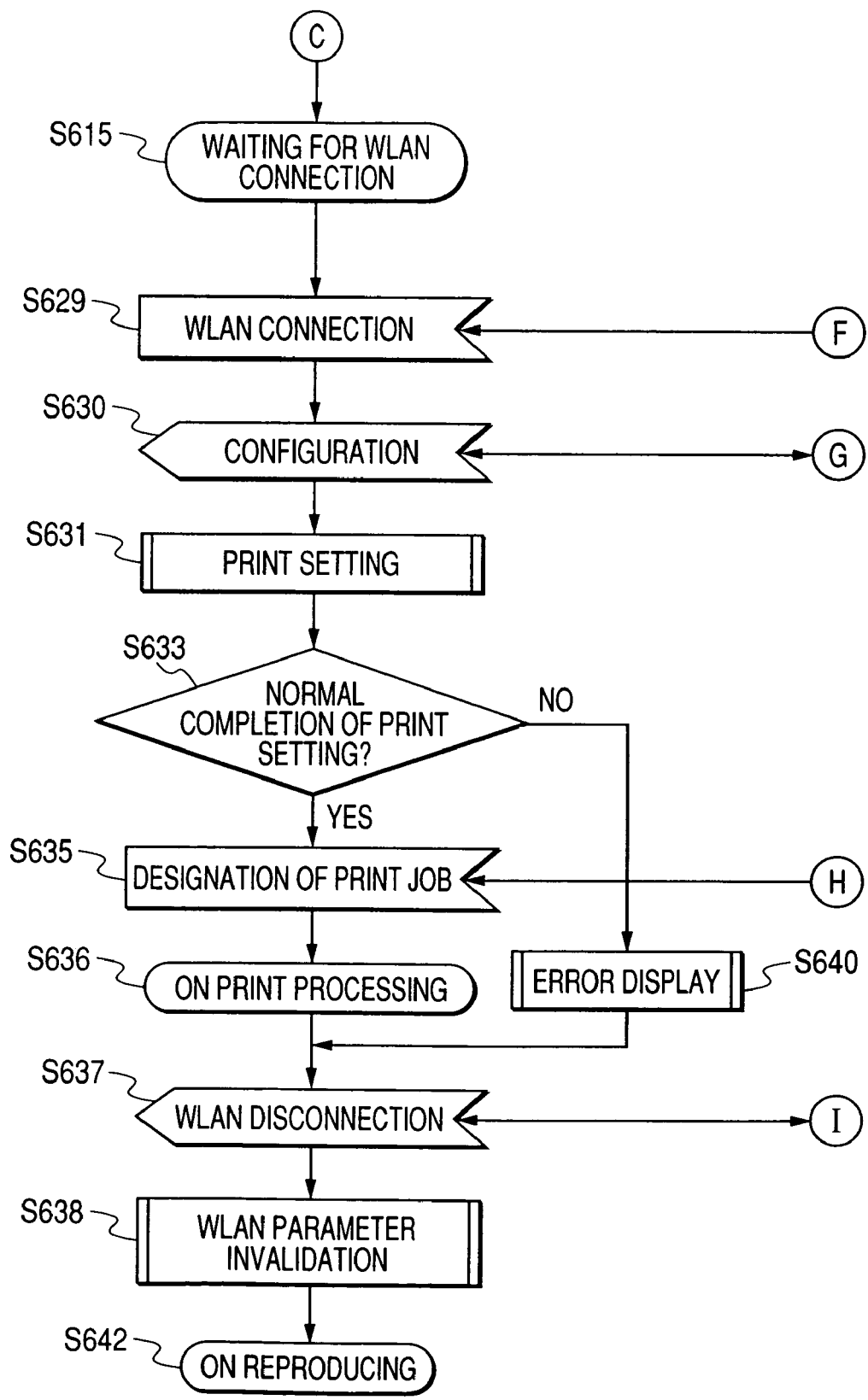

FIG. 5 shows a process sequence of the present embodiment, and FIGS. 6A, 6B, 6C and 6D show a state transition of the present embodiment. In the following, operations of the present embodiment will be explained with reference to FIGS. 5, 6A, 6B, 6C and 6D.

The user operates the operation unit 115 of the digital camera 110 to select an image to be printed (steps S501, S601) In this operation, in the digital camera 110, there is simultaneously generated a print job parameter for printing (step S602), and the digital camera 110 enters a state of awaiting a trigger (step S603) from the setting terminal 130. In the present embodiment, the print job parameter is identification information for specifying the print job present in the digital camera, but it may also be a print job itself.

Then the user operates the operation unit 135 of the setting terminal 130 (step S604), thereby transmitting predetermined information to the digital camera 110. At this operation, the operating terminal 130 generates a unique temporary wireless LAN parameter for example from a serial number of the operating terminal 130 itself and a current time managed by the clock unit 137 (step S605), and transmits the wireless LAN parameter by an infrared communication to the digital camera 110 through the parameter transmission unit 131 (steps S502, S606).

Thereafter the setting terminal 130 enters a state awaiting a parameter reception from the digital camera 110 (step S612), and displays a message indicating that a parameter setting is under way, on the display unit 136. The digital camera 110 receives the wireless LAN parameter through the parameter reception unit 112 (step S607), and sets the wireless LAN parameter as a parameter of the equipment (steps S503, S608). Then it transmits the print job parameter generated in the step S602, through the parameter transmission unit 111 to the setting terminal 130 (steps S504, S611), and enters a state of awaiting a wireless LAN connection from the printer 120 (step S615).

In case the digital camera 110 cannot receive the wireless LAN parameter from the setting terminal 130 even after the lapse of a predetermined time (step S607), it generates a time-out 609 and returns to the initial state (step S610).

The setting terminal 130, upon receiving the print job parameter by the infrared communication (step S613), counts a number of the received print job parameter (step S616), and, in case its number is one, enters a state of awaiting a next operation from the user (step S617), and displays, on the display unit 136, a message indicating a completion of the parameter setting.

In case the print job parameter cannot be received within a predetermined time (step S613) to cause a time-out (step S614) or in case the step S616 judges a reception of plural print job parameters, an error is displayed (step S628) and the terminal returns to an initial state (step S627) and displays a message indicating an initial state on the display unit 136.

Then the user operates the operation unit 135 of the setting terminal 130 onto the printer 120 (step S618), whereby the setting terminal transmits a wireless LAN parameter same as that transmitted to the digital camera 110 in the steps S502 and S606, and the print job parameter received in the steps S504, S613 to the printer by an infrared communication (steps S505, S619), then enters a state awaiting a setting completion notice (step S623) and displays a message indicating a state that a parameter setting is under way, on the display unit 136.

The printer 120, upon receiving various parameters from the setting terminal 130 (step S620), sets them as its parameters (steps S506, S621), and sends a setting completion notice to the setting terminal by an infrared communication (steps S507, S622).

The setting terminal 130, upon receiving the setting completion notice from the printer 120 (step S624), counts a number of the received completion notice (step S625), and, in case it is one, enters a setting completion state (step S626) and displays a message indicating a setting completion on the display unit 136. Thereafter the setting terminal returns to the initial state (step S627) and displays a message indicating an initial state on the display unit 136.

In case the number of the received completion notice is plural, the terminal displays an error (step S628), returns to the initial state (step S627) and displays a message indicating an initial state on the display unit 136. The operations by the user are limited to the foregoing, and a direct printing process is thereafter executed between the printer 120 and the digital camera 110.

The printer 120 request a wireless connection to the digital camera 110, utilizing the wireless LAN parameters set in the steps S506 and S621, and, when the digital camera 110 accepts the request and a wireless connection is established between the printer 120 and the digital camera 110 (steps S508, S629), a configuration for executing a direct print is executed between the equipment (steps S509, S630), whereby a print setting is completed (steps S510, S630).

When the print setting is judged to have been properly completed (steps S632, S633), the printer 120 transmits, to the digital camera 110, the print job parameter received in the step S620 (steps S511, S634). The digital camera 110, upon receiving the print job parameter (step S635), executes a direct print process between the equipment, according to the print job specified by the parameter (steps S512, S636).

Upon completion of the direct print process (steps S512, S636), the printer 120 cuts off the wireless connection (steps S513, S637), and both equipment invalidate the wireless LAN parameter set in the steps S608, S621 (steps S514, S638) and return to the initial state (steps S641, S642).

In case the print setting cannot be completed properly in the steps S632, S633, both equipment display an error (steps S639, S640), then cut off the wireless connection (steps S513, S637), invalidate the wireless LAN parameter (steps S514, S638) and return to the initial state (steps S641, S642).

In the present embodiment, as explained in the foregoing, it is unnecessary to cause the user to enter the wireless parameters by the UI of the incorporated equipment as in the prior technology, but the wireless parameter setting of the incorporated equipment to be utilized can be achieved by merely depressing a button of the setting terminal and also a serial process from the setting of the wireless parameters to the direct printing can be realized by the operation of the setting terminal only, whereby an easily usable wireless direct print system can be provided.

Also in case of transferring a wireless parameter of either equipment to the other equipment by a wired cable, it is required in the prior technology that the wireless parameter is set in either equipment, but, in the present embodiment, it is not required that the wireless parameter is set in either equipment since the setting terminal generates, at the setting of the wireless parameter, a unique temporary wireless parameter. Also as a unique temporary wireless parameter is generated at each execution of the direct printing, a firmer security can be ensured than in a case of utilizing a same wireless parameter continuously.

Furthermore, in the present embodiment, a status of the entire system can be informed to the user by display means such as an LED in the setting terminal, and the user can manage the entire system by an operation and a display of the setting terminal only.

Also the setting terminal counts a number of the print job parameter received from the first communication equipment and a number of setting completion notice from the second communication equipment and can therefore judge an erroneous wireless setting to an unintended communication equipment in case of receiving messages from plural communication equipment, thereby preventing an erroneous setting on the unintended equipment.

The present embodiment employs an infrared communication as the first communication means for transmission/reception of the parameters and a wireless LAN as the second communication means for realizing a direct print between the first communication equipment and the second communication equipment, but the present invention is not limited to such configuration and other wireless communication methods are also usable. Also the first communication equipment is not limited to a digital camera but can also be an equipment having image storage means and wireless/communication means, such as a DVD player or a home server, and also the third communication equipment may be any equipment capable of communicating with the first and second communication equipment such as a remote control, a cellular phone, or an exclusive setting terminal.

Also in the wireless parameter generation in the third communication equipment, the present embodiment generates the parameter from the serial number, the current time and the like, but the present invention is not limited to such case and is applicable to any device or algorithm capable of generating a unique wireless parameter.

Second Embodiment

Figure 7:
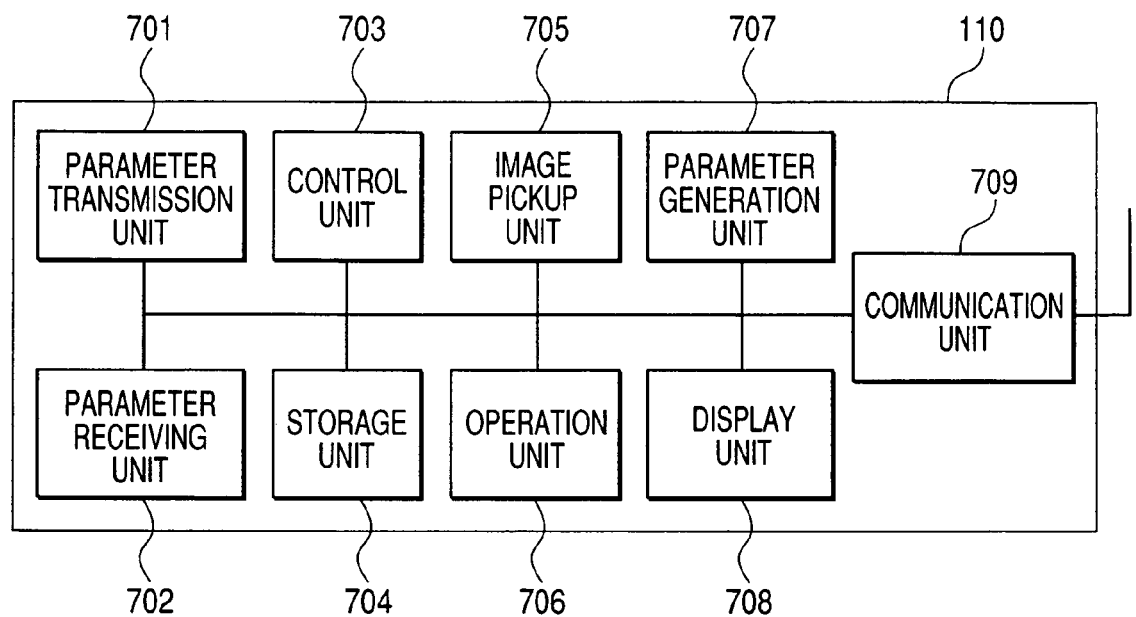
FIG. 7 is a view showing a configuration of a first communication equipment in a second embodiment.

The present embodiment has a system configuration similar to that of the first embodiment shown in FIG. 1. FIG. 7 is a view showing the configuration of a digital camera constituting the first communication equipment 110 and realizing the present embodiment, and it is constituted of a parameter transmission unit 701 and a parameter reception unit 702 for executing transmission/reception of various parameters from/to the third communication equipment 130 by the first communication means, a control unit 703 for controlling the entire equipment, a storage unit 704 for storing image data, an image pickup unit 705 for executing an image pickup by a user operation on an operation unit 706, a display unit 708 for displaying an image, a communication unit 709 for executing a communication with the second communication equipment by the second communication means, and a parameter generation unit 707 for generating a wireless parameter.

A printer constituting the second communication equipment 120 has a configuration similar to that of the printer of the first embodiment shown in FIG. 3.

Figure 8:
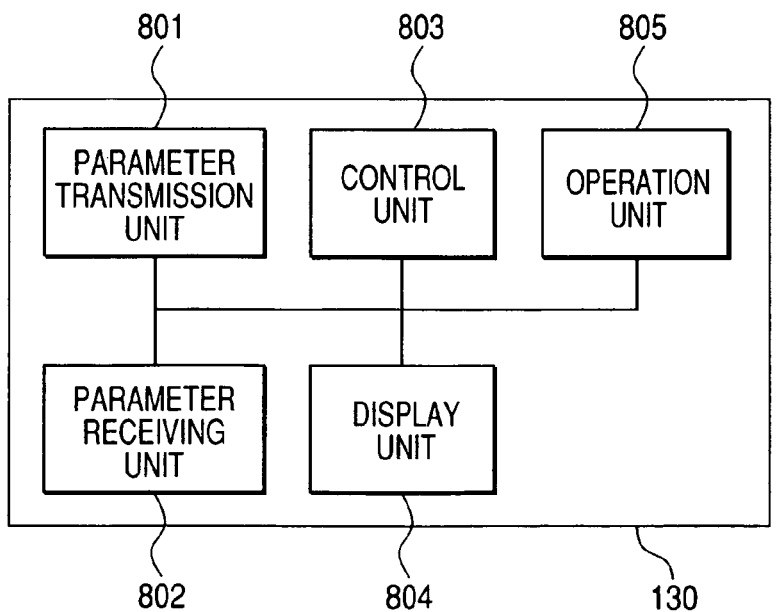
FIG. 8 is a view showing a configuration of a third communication equipment in the second embodiment.

FIG. 8 is a view showing the configuration of the setting terminal (portable terminal such as a remote control or a cellular phone) constituting the third communication equipment 130 and realizing the present embodiment, and it is constituted of a parameter transmission unit 801 and a parameter reception unit 802 for executing transmission/reception of various parameters from/to the digital camera 110 and the printer 120 by the first communication means, a control unit 803 for controlling the entire equipment, a display unit 804 for displaying a system status, and an operation unit 805.

Figure 9:
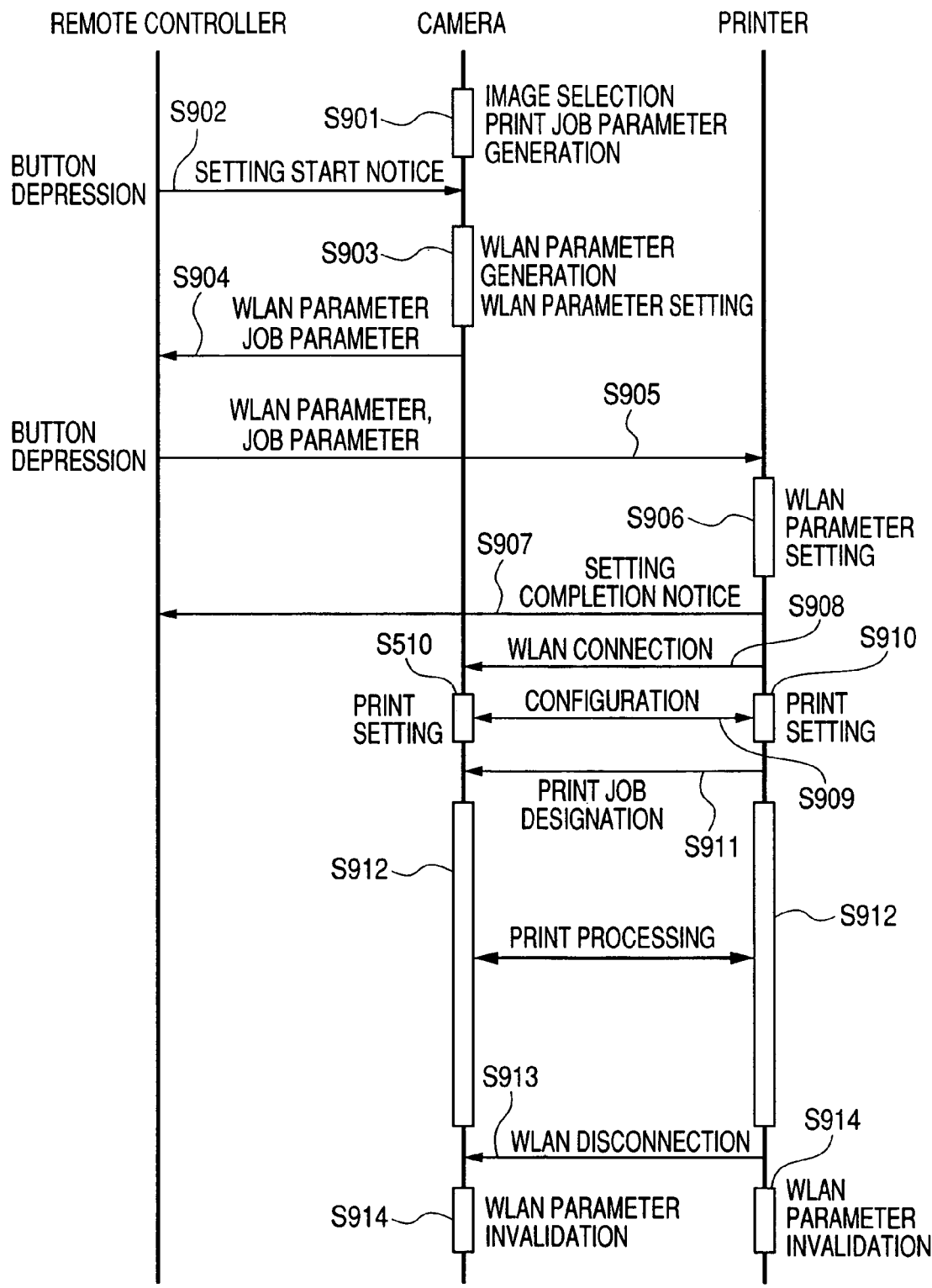
FIG. 9 is a view showing a process sequence of the second embodiment.
Figure 10A:
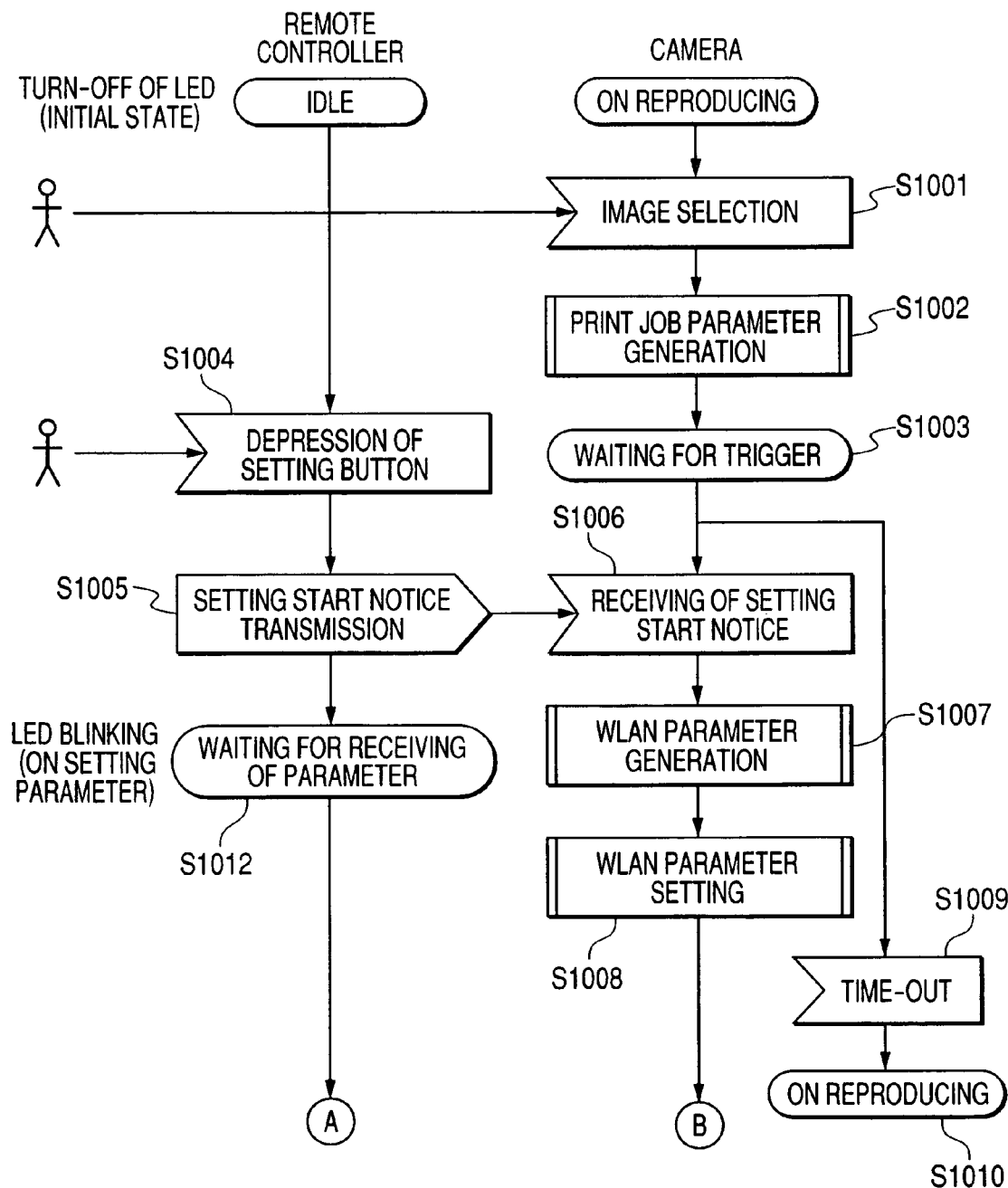
FIG. 10 which is composed of FIGS. 10A, 10B, 10C and 10D views showing a state transition in the second embodiment.
Figure 10B:
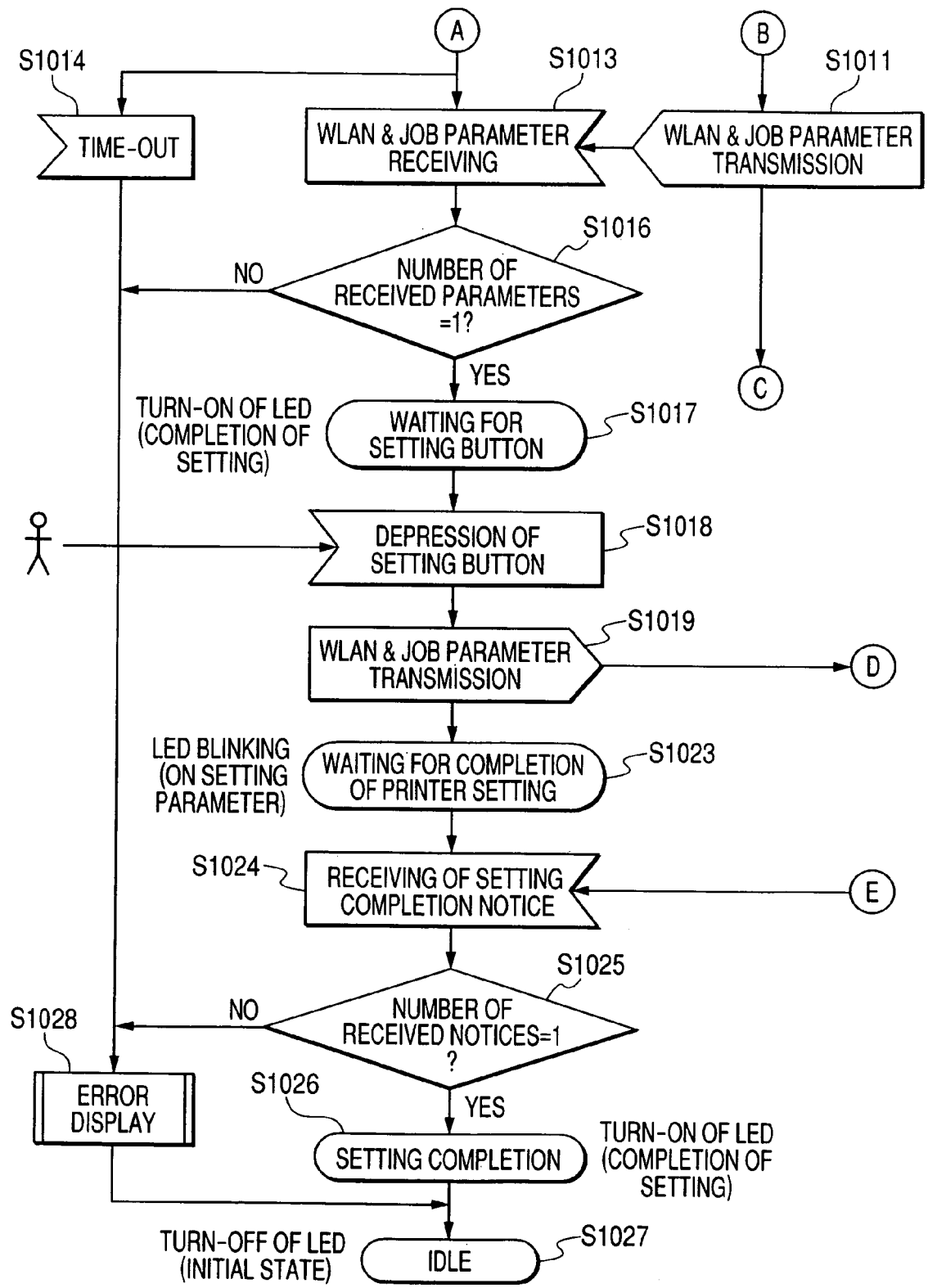
Figure 10C:
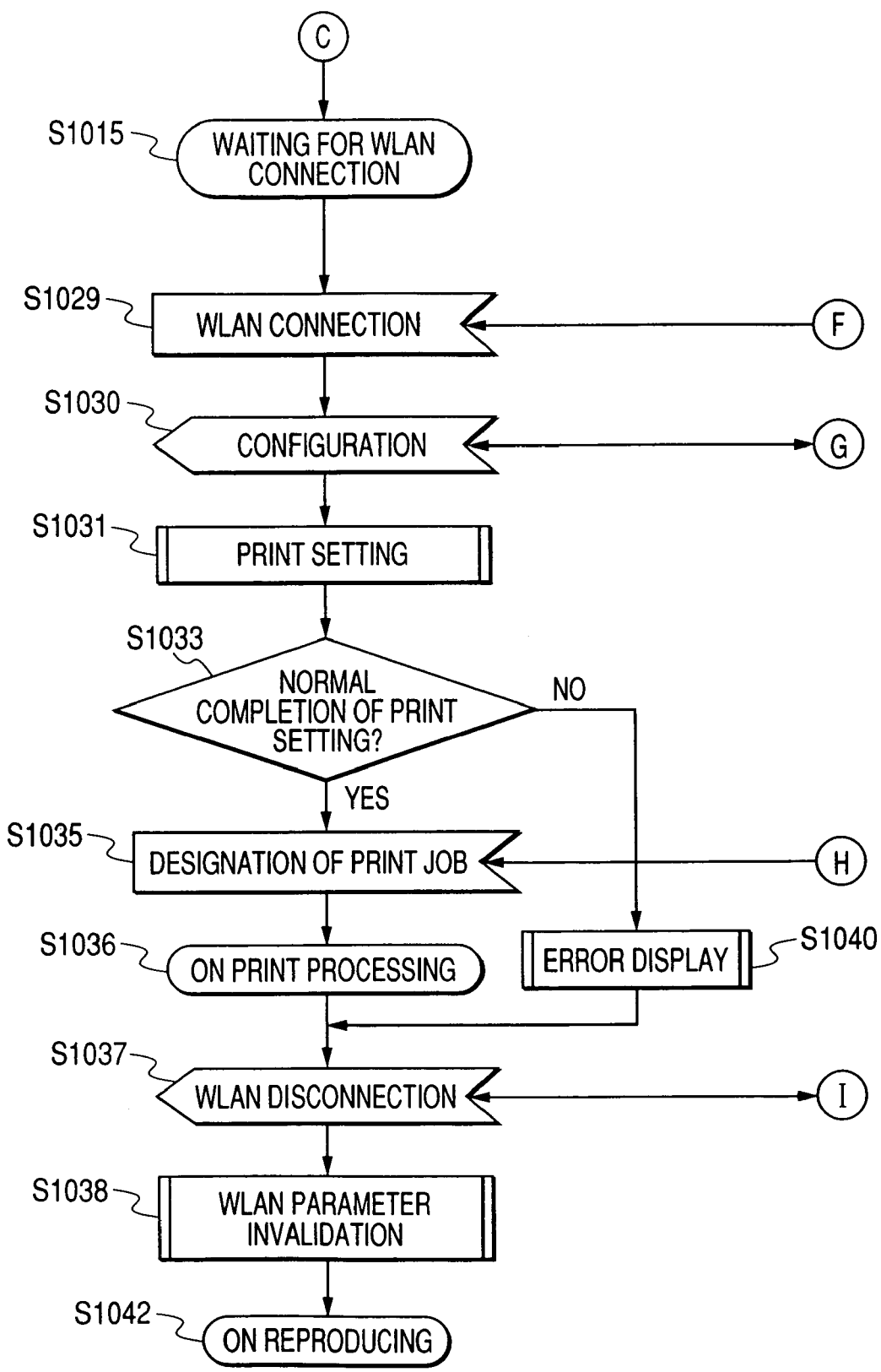
Figure 10D:
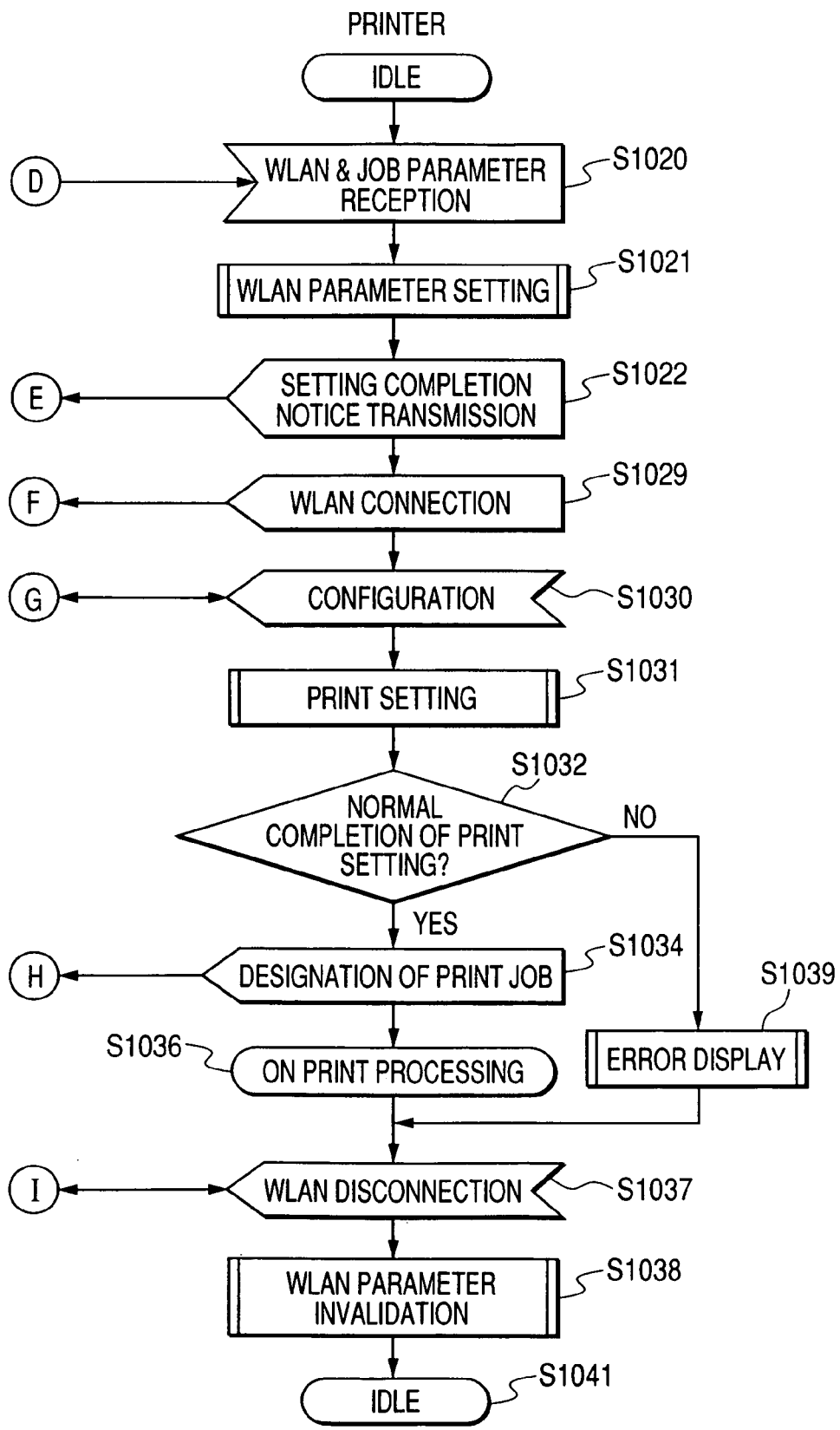

FIG. 9 shows a process sequence of the present embodiment, and FIGS. 10A, 10B, 10C and 10D show a state transition of the present embodiment.

In the following, operations of the present embodiment will be explained with reference to FIGS. 9, 10A, 10B, 10C and 10D.

The user operates the operation unit 706 of the digital camera 110 to select an image to be printed (steps S901, S1001). In this operation, in the digital camera 110, there is simultaneously generated a print job parameter for printing (step S1002), and the digital camera 110 enters a state of awaiting a trigger (step S1003) from the setting terminal 130. In the present embodiment, the print job parameter is identification information for specifying the print job present in the digital camera, but it may also be a print job itself.

Then the user operates the operation unit 805 of the setting terminal 130 (step S1004), thereby transmitting a setting start notice to the digital camera 110 by an infrared communication through the parameter transmission unit 801 (steps S902, S1005). Thereafter the setting terminal 130 enters a state awaiting a parameter reception from the digital camera 110 (step S1012), and displays a message, indicating that a parameter setting is under way, on the display unit 804.

The digital camera 110 receives the setting start notice through the parameter reception unit 702 (step S1006), generates a unique temporary wireless LAN parameter from a serial number and a current time of the digital camera 110 itself (steps S903, S1007), and sets the wireless LAN parameter as its parameter (steps S903, S1008). Then it transmits the print job parameter and the wireless LAN parameter, generated in the steps S1002 and S1007, through the parameter transmission unit 701 to the setting terminal 130 (steps S904, S1001), and enters a state of awaiting a wireless LAN connection from the printer 120 (step S1015).

In case the digital camera 110 cannot receive the setting start notice from the setting terminal 130 even after the lapse of a predetermined time (step S1006), it generates a time-out (step S1009) and returns to the initial state (step S1010).

The setting terminal 130, upon receiving the print job parameter and the wireless LAN parameter by the infrared communication (step S1013), counts a number of the received wireless LAN parameter and the received print job parameter (step S1016), and, in case the number is one each, enters a state of awaiting a next operation from the user (step S1017), and displays, on the display unit 804, a message indicating a completion of the parameter setting of the digital camera 110.

In case the wireless LAN parameter and the print job parameter cannot be received within a predetermined time (step S1013) to cause a time-out (step S1014) or in case the step S1016 judges a reception of plural print job parameters, an error is displayed (step S1028) and the terminal returns to an initial state (step S1027) and displays a message indicating an initial state on the display unit 804.

Thereafter a process between the setting terminal 13b and the printer 120 and that between the printer 120 and the digital camera 110 are similar to those in the first embodiment.

In the present embodiment, as explained in the foregoing, it is unnecessary to cause the user to enter the wireless parameters by the UI of the incorporated equipment as in the prior technology, but the wireless parameter setting of the incorporated equipment to be utilized can be achieved by merely depressing a button of the setting terminal and also a serial process from the setting of the wireless parameters to the direct printing can be realized by the operation of the setting terminal only, whereby an easily usable wireless direct print system can be provided.

Also in case of transferring a wireless parameter of either equipment to the other equipment by a wired cable, it is required in the prior technology that the wireless parameter is set in either equipment, but, in the present embodiment, it is not required that the wireless parameter is set in either equipment since the setting terminal generates, at the setting of the wireless parameter, a unique temporary wireless parameter. Also as a unique temporary wireless parameter is generated at each execution of the direct printing, a firmer security can be ensured than in a case of utilizing a same wireless parameter continuously. Furthermore, the generation of the wireless LAN parameter is realized not in the setting terminal but in the first communication equipment of a superior performance, whereby the wireless LAN parameter can be generated at a high speed with a lowered burden on the setting terminal.

Furthermore, in the present embodiment, a status of the entire system can be informed to the user by display means such as an LED in the setting terminal, and the user can manage the entire system by an operation and a display of the setting terminal only.

Also the setting terminal counts a number of the wireless LAN parameter and the print job parameter received from the first communication equipment and a number of setting completion notice from the second communication equipment and can therefore judge an erroneous wireless setting to an unintended communication equipment in case of receiving messages from plural communication equipment, thereby preventing an erroneous setting on the unintended equipment.

The present embodiment employs an infrared communication as the first communication means for transmission/reception of the parameters and a wireless LAN as the second communication means for realizing a direct print between the first communication equipment and the second communication equipment, but the present invention is not limited to such configuration and other wireless communication methods are also usable. Also the first communication equipment is not limited to a digital camera but can also be an equipment having image storage means and wireless communication means, such as a DVD player or a home server, and also the third communication equipment may be any equipment capable of communicating with the first and second communication equipment such as a remote control, a cellular phone, or an exclusive setting terminal.

Also in the wireless parameter generation in the third communication equipment, the present embodiment generates the parameter from the serial number, the current time and the like, but the present invention is not limited to such case and is applicable to any device or algorithm capable of generating a unique wireless parameter.

Third Embodiment

The system configuration of the present embodiment and the configurations of the first, second and third communication equipment are similar to those of the first embodiment shown in FIGS. 1 to 4.

Figure 11:
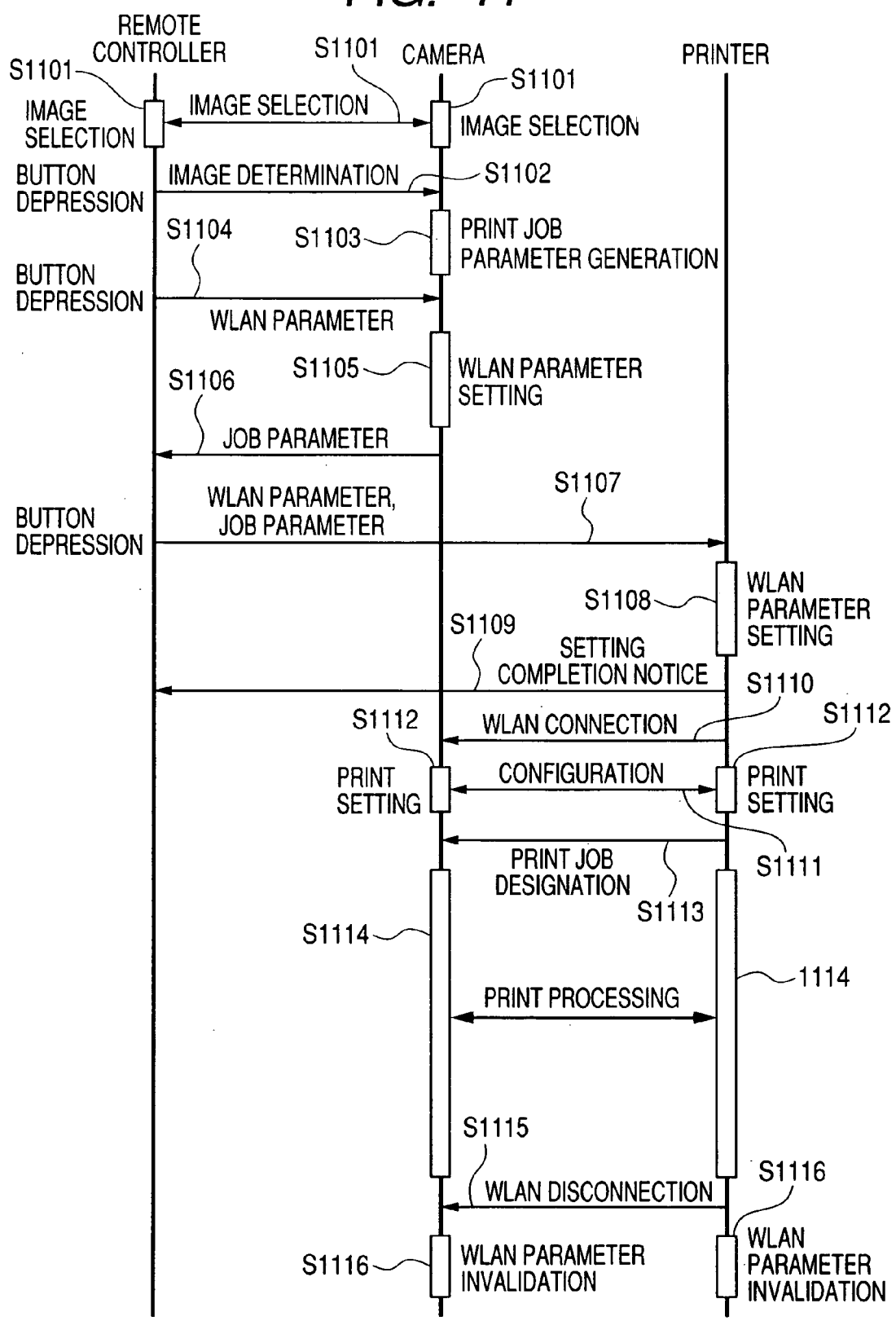
FIG. 11 is a view showing a process sequence of a third embodiment.
Figure 12B:
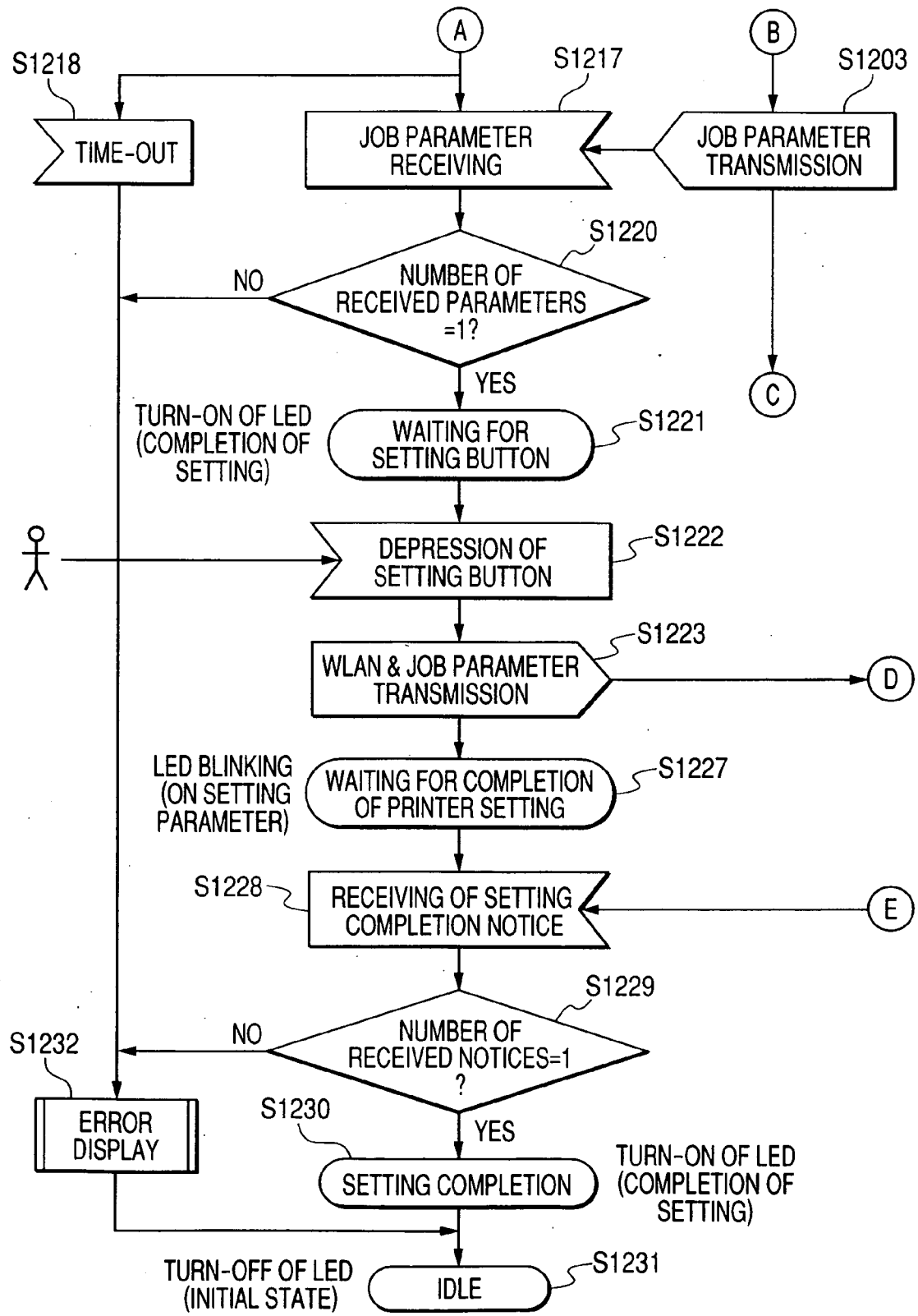
FIG. 12 which is composed of FIGS. 12A, 12B, 12C and 12D are views showing a state transition in the third embodiment.
Figure 12C:
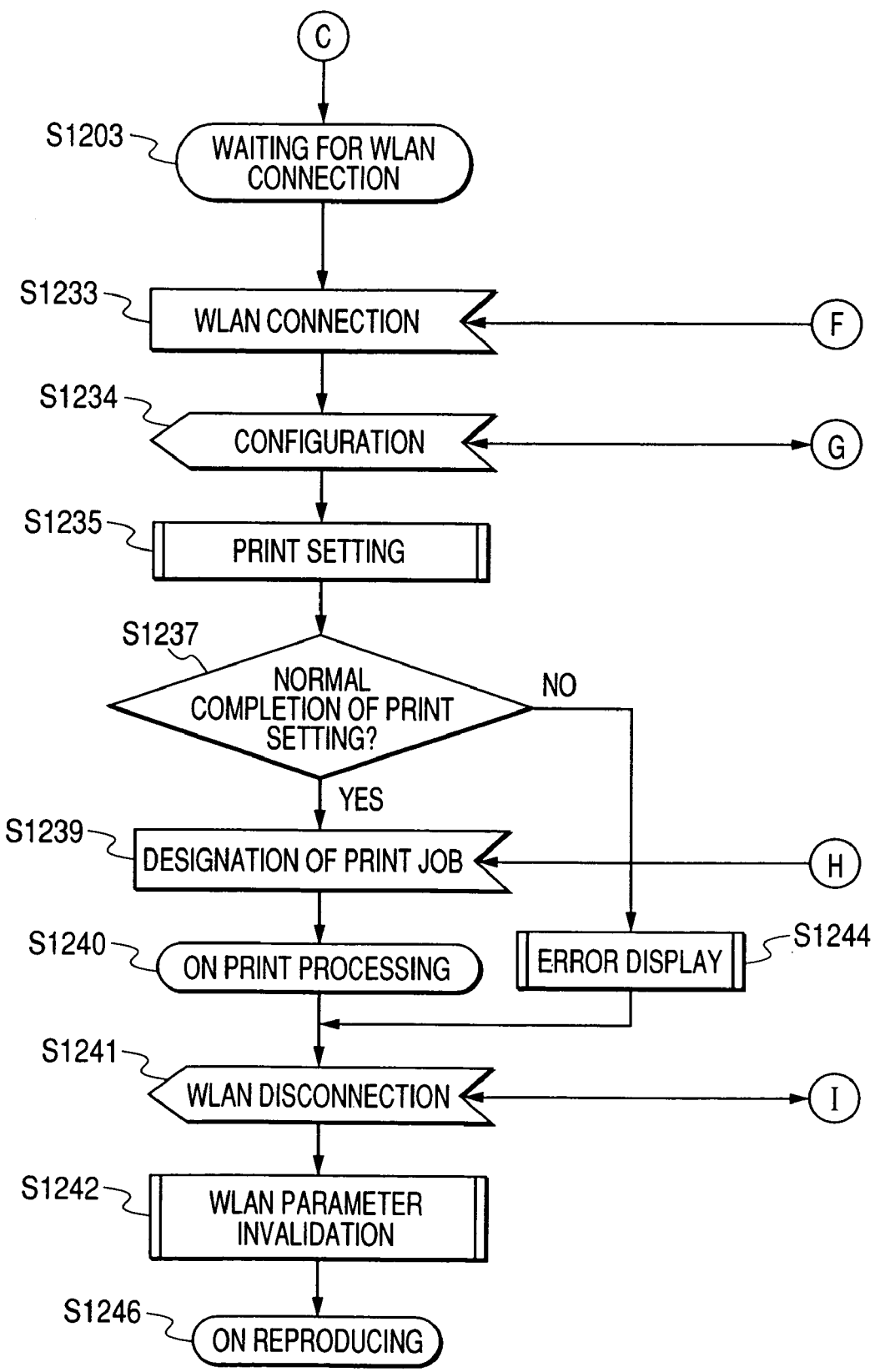
Figure 12D:
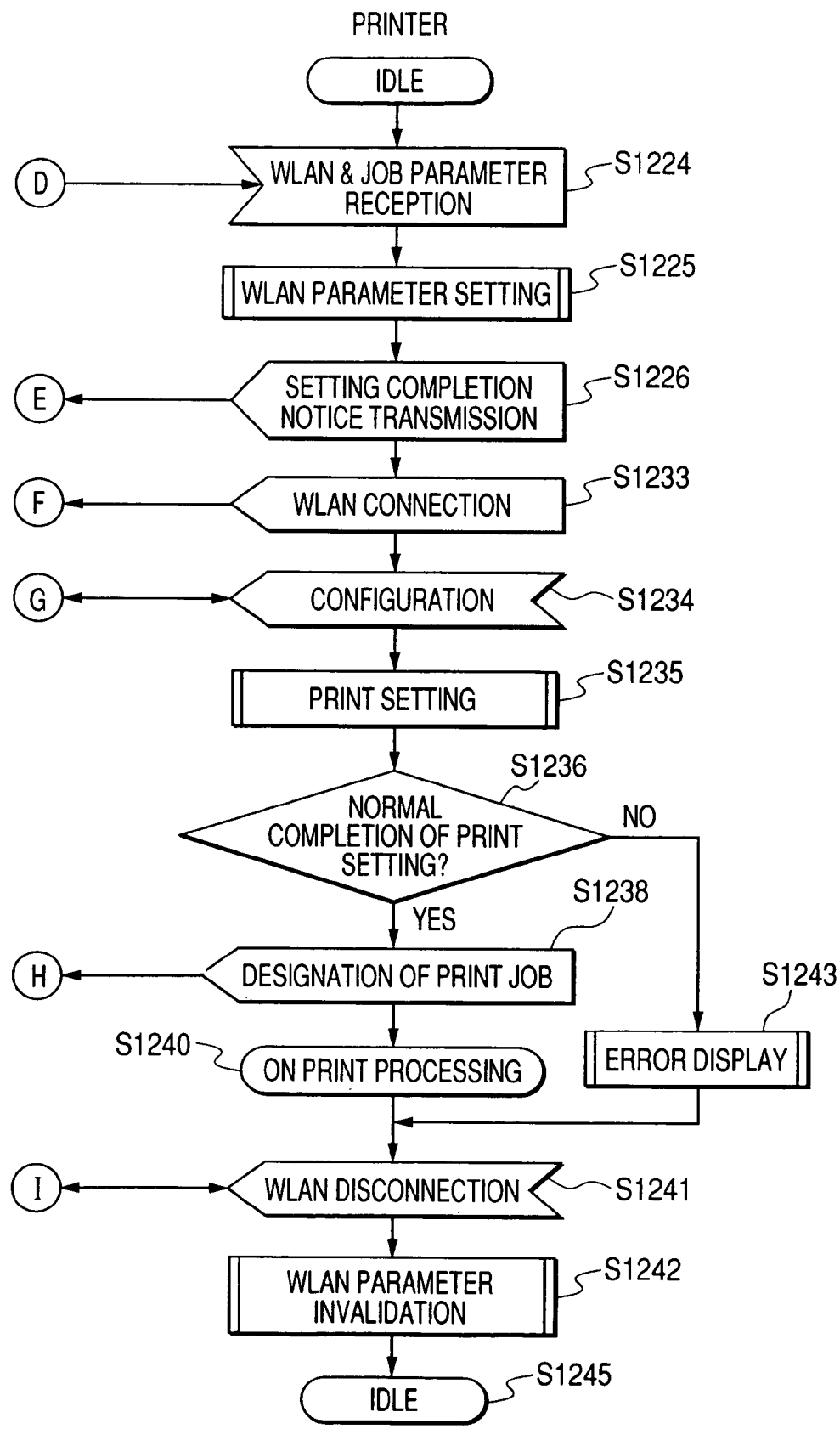
Figure 14B:
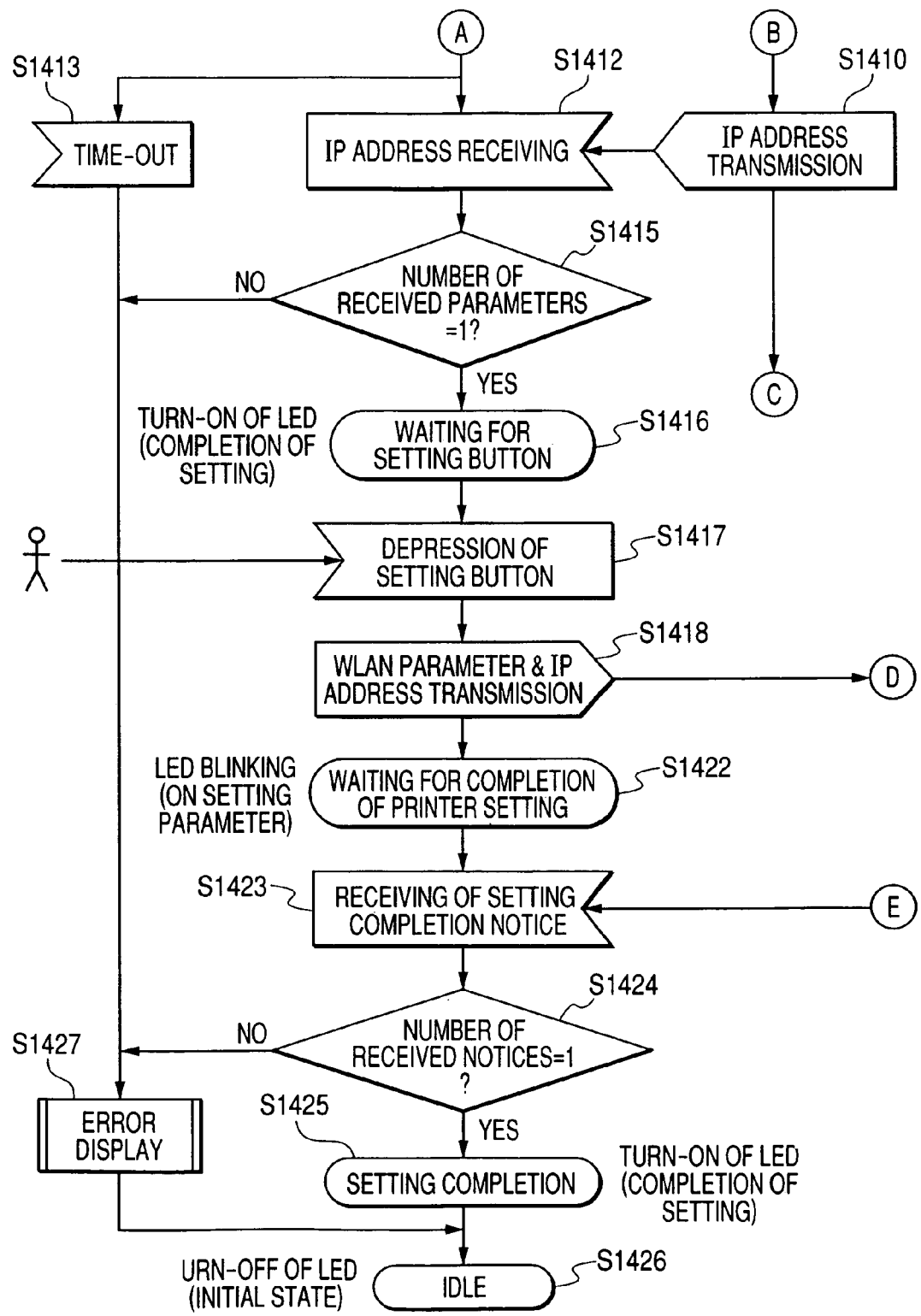
FIG. 14 which is composed of FIGS. 14A, 14B, 14C and 14D are views showing a state transition in the fourth embodiment.
Figure 14C:
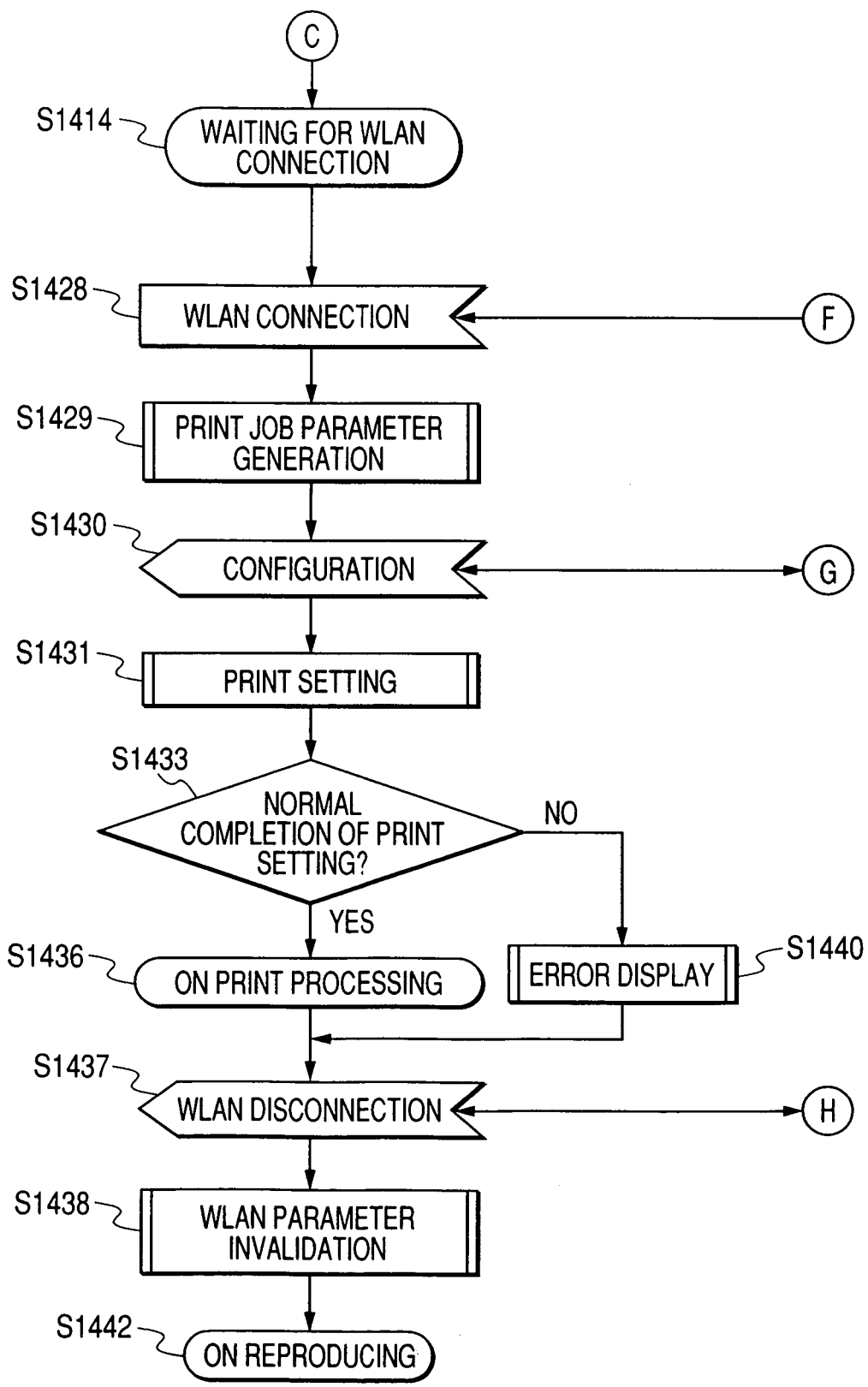
Figure 14D:
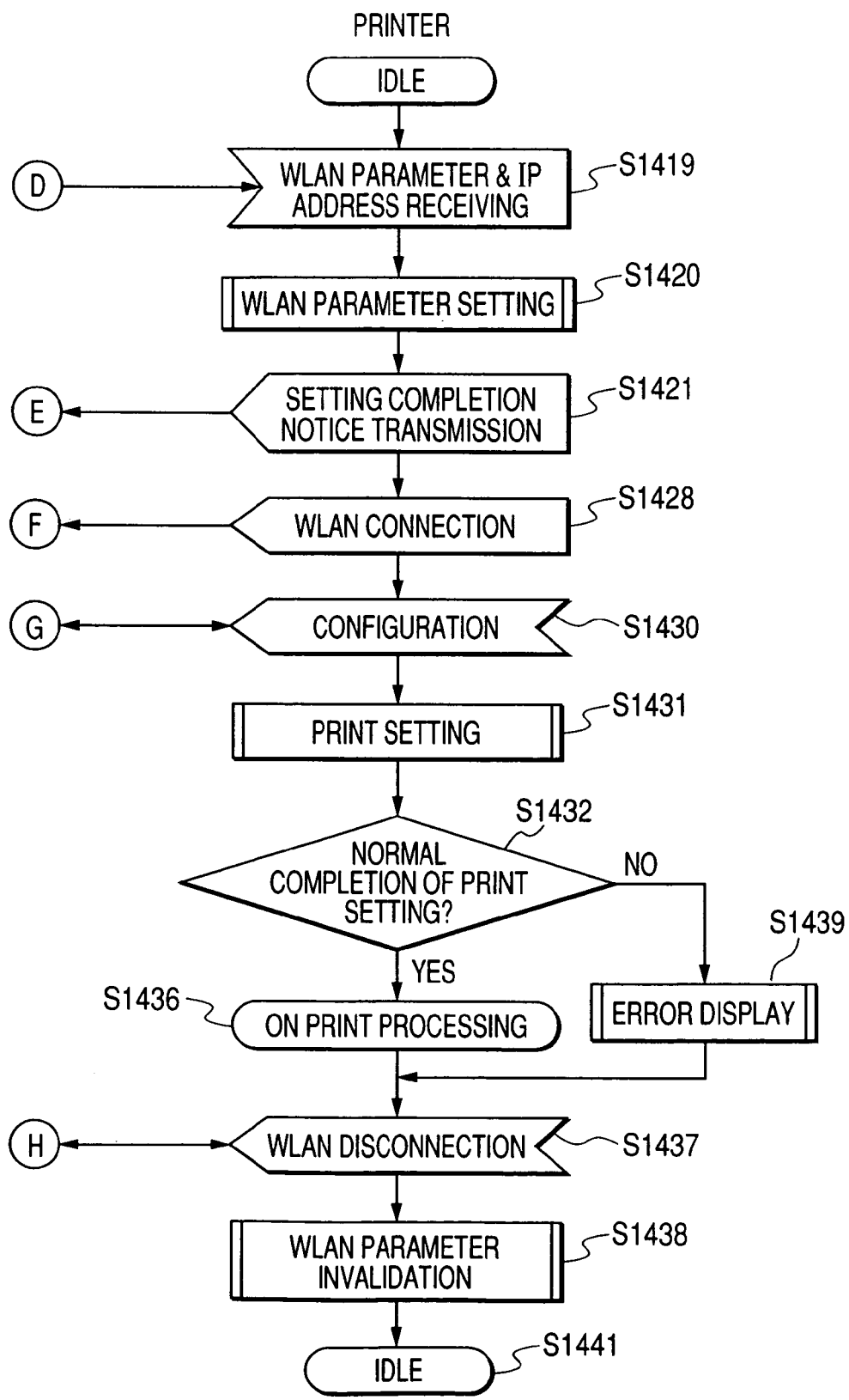

FIG. 11 shows a process sequence of the present embodiment, and FIGS. 12A, 12B, 12C and 12D show a state transition of the present embodiment.

In the following, operations of the present embodiment will be explained with reference to FIGS. 11, 12A, 12B, 12C and 12D.

The user operates the operation unit 135 of the setting terminal 130 (step S1201), thereby executing an image selecting process onto the digital camera 110 by an infrared communication (steps S1101, S1202) This image selecting process (steps S1101, S1202) is a bi-directional process, and is executed by the setting terminal 130 and the digital camera 110 through the parameter transmission units 111, 131 and the parameter reception units 112, 132 thereof in repeated manner until the user finds a desired image. The user, upon deciding an image to be printed by the selecting process (steps S1101, S1201), operates the operation unit 135 of the setting terminal 130 (step S1203) thereby transmitting an image decision message to the digital camera 110 (steps S1102, S1204).

The digital camera 110, upon receiving the image decision message (step S1205), generates a print job parameter from the decided image (step S1206), and enters a state of awaiting a trigger (step S1207) from the setting terminal 130. In the present embodiment, the print job parameter is identification information for specifying the print job present in the digital camera, but it may also be a print job itself.

Thereafter a wireless LAN parameter generation, a parameter transfer process between the setting terminal 130 and the digital camera 110, a process between the setting terminal 130 and the printer 120 and a process between the printer 120 and the digital camera 110 are similar to those in the first embodiment. Also the wireless LAN parameter generation may be executed in the setting terminal as in the first embodiment or in the digital camera 110.

In the present embodiment, as explained in the foregoing, it is unnecessary to cause the user to enter the wireless parameters by the UI of the incorporated equipment as in the prior technology, but the wireless parameter setting of the incorporated equipment to be utilized can be achieved by merely depressing a button of the setting terminal and also a serial process from the setting of the wireless parameters to the direct printing can be realized by the operation of the setting terminal only, whereby an easily usable wireless direct print system can be provided.

Also in the present embodiment, the image selecting process by the user is executed at the setting terminal, whereby the interface operated by the user is unified to the setting terminal and the operability for the user can be improved further.

Also in case of transferring a wireless parameter of either equipment to the other equipment by a wired cable, it is required in the prior technology that the wireless parameter is set in either equipment, but, in the present embodiment, it is not required that the wireless parameter is set in either equipment since the setting terminal generates, at the setting of the wireless parameter, a unique temporary wireless parameter. Also since a unique temporary wireless parameter is generated at each execution of the direct printing, a firmer security can be ensured than in a case of utilizing a same wireless parameter continuously.

Furthermore, in the present embodiment, a status of the entire system can be informed to the user by display means such as an LED in the setting terminal, and the user can manage the entire system by an operation and a display of the setting terminal only.

Also the setting terminal counts a number of the wireless LAN parameter and the print job parameter received from the first communication equipment and a number of setting completion notice from the second communication equipment and can therefore judge an erroneous wireless setting to an unintended communication equipment in case of receiving messages from plural communication equipment, thereby preventing an erroneous setting on the unintended equipment.

The present embodiment employs an infrared communication as the first communication means for transmission/reception of the parameters and a wireless LAN as the second communication means for realizing a direct print between the first communication equipment and the second communication equipment, but the present invention is not limited to such configuration and other wireless communication methods are also usable. Also the first communication equipment is not limited to a digital camera but can also be an equipment having image storage means and wireless communication means, such as a DVD player or a home server, and also the third communication equipment may be any equipment capable of communicating with the first and second communication equipment such as a remote control, a cellular phone, or an exclusive setting terminal.

Also in the wireless parameter generation in the third communication equipment, the present embodiment generates the parameter from the serial number, the current time and the like, but the present invention is not limited to such case and is applicable to any device or algorithm capable of generating a unique wireless parameter.

Fourth Embodiment

The system configuration of the present embodiment and the configurations of the first, second and third communication equipment are similar to those of the first embodiment shown in FIGS. 1 to 4.

FIG. 13 shows a process sequence of the present embodiment, and FIGS. 14A, 14B, 14C, and 14D show a state transition of the present embodiment.

In the following, operations of the present embodiment will be explained with reference to FIGS. 13, 14A, 14B, 14C and 14D.

The user operates the operation unit 115 of the digital camera 110 to select an image to be printed (steps S1301, S1401), and the digital camera 110 enters a state of awaiting a trigger (step S1402) from the setting terminal 130.

Then the user operates the operation unit 135 of the setting terminal 130 (step S1403), thereby transmitting predetermined information to the digital camera 110. At this operation, the operating terminal 130 generates a unique temporary wireless LAN parameter for example from a serial number of the operating terminal 130 itself and a current time managed by the clock unit 137 (step S1404), and transmits the wireless LAN parameter by an infrared communication to the digital camera 110 through the parameter transmission unit 131 (steps S1302, S1405).

Thereafter the setting terminal 130 enters a state awaiting a parameter reception from the digital camera 110 (step S1411), and displays a message, indicating that a parameter setting is under way, on the display unit 136. The digital camera 110 receives the wireless LAN parameter through the parameter reception unit 112 (step S1406), and sets the wireless LAN parameter as its parameter (steps S1303, S1407). Then the digital camera 110 transmits its IP address through the parameter transmission unit 111 to the setting terminal (steps S1304, S1410), and enters a state of awaiting a wireless LAN connection from the printer 120 (step S1414).

In case the digital camera 110 cannot receive the wireless LAN parameter from the setting terminal 130 even after the lapse of a predetermined time (step S1406), it generates a time-out (step S1408) and returns to the initial state (step S1409).

The setting terminal 130, upon receiving the IP address by the infrared communication (step S1412), counts a number of the received IP address (step S1415), and in case the number is one, enters a state for awaiting next operation by the user (step S1416), and displays a message indicating completion of the parameter setting of the digital camera, on the display unit 136.

In case the IP address cannot be received even after the predetermined time (step S1412) to cause a time-out (step S1413) or in case the step S1415 judges reception of plural IP addresses, the terminal displays an error (S1427), then returns to the initial state (S1426) and displays a message indicating the initial state on the display unit 136.

Then the user operates the operation unit 135 of the setting terminal 130 directed toward the printer 120 (step S1417), whereby the terminal transmits a wireless LAN parameter same as that transmitted to the digital camera 110 in the steps S1302 and S1405, and an IP address received in the steps S1304, S1412, to the printer 120 by an infrared communication (Steps S1305, S1418), then enters a state awaiting a setting completion notice (step S1422), and displays a message indicating a state that a parameter setting is under way, on the display unit 136. The printer 120, upon receiving various parameters from the setting terminal 130 (step S1419), sets them as its parameters (steps S1306, S1420), and sends a setting completion notice to the setting terminal by an infrared communication (steps S1307, S1421).

The setting terminal 130, upon receiving the setting completion notice from the printer 120 (step S1423), counts a number of the received completion notice (step S1424), and, in case it is one, enters a setting completion state (step S1425)

and displays a message indicating a setting completion on the display unit 136. Thereafter the setting terminal returns to the initial state (step S1526) and displays a message indicating an initial state on the display unit 136.

In case the number of the received completion notice is plural, the terminal displays an error (step S1427), returns to the initial state (step S1426) and displays a message indicating an initial state on the display unit 136. The operations by the user are limited to the foregoing, and a direct printing process is thereafter executed between the printer 120 and the digital camera 110.

The printer 120 request a wireless connection to the digital camera 110, utilizing the wireless LAN parameters set in the steps S1306 and S1420, and, when the digital camera 110 accepts the request and a wireless connection is established between the printer 120 and the digital camera 110 (steps S1308, S1428), the digital camera 110 generates a print job parameter based on the image selected in the steps S1301, S1401 (steps S1309, S1429). Thereafter a configuration for executing a direct print is executed between the equipment (steps S1310, S1430), whereby a print setting is completed (steps S1311, S1431). When the print setting is judged to have been properly completed (steps S1432, S1433), a direct print process is executed between the equipment (steps S1312, S1436).

Upon completion of the direct print process (steps S1312, S1436), the printer 120 cuts off the wireless connection (steps S1313, S1437), and both equipment invalidate the wireless LAN parameter set in the steps S1407, S1420 (steps S1314, S1438) and return to the initial state (steps S1441, S1442).

In case the print setting cannot be completed properly in the steps S1432, S1433, both equipment display an error (steps S1439, S1440), then cut off the wireless connection (steps S1313, S1437), invalidate the wireless LAN parameter (steps S1314, S1438) and return to the initial state (steps S1441, S1442).

In the present embodiment, as explained in the foregoing, it is unnecessary to cause the user to enter the wireless parameters by the UI of the incorporated equipment as in the prior technology, but the wireless parameter setting of the incorporated equipment to be utilized can be achieved by merely depressing a button of the setting terminal and also a serial process from the setting of the wireless parameters to the direct printing can be realized by the operation of the setting terminal only, whereby an easily usable wireless direct print system can be provided.

Also in case of transferring a wireless parameter of either equipment to the other equipment by a wired cable, it is required in the prior technology that the wireless parameter is set in either equipment, but, in the present embodiment, it is not required that the wireless parameter is set in either equipment since the setting terminal generates, at the setting of the wireless parameter, a unique temporary wireless parameter. Also as a unique temporary wireless parameter is generated at each execution of the direct printing, a firmer security can be ensured than in a case of utilizing a same wireless parameter continuously.

Furthermore, in the present embodiment, a status of the entire system can be informed to the user by display means such as an LED in the setting terminal, and the user can manage the entire system by an operation and a display of the setting terminal only.

Also the setting terminal counts a number of the print job parameter received from the first communication equipment and a number of setting completion notice from the second communication equipment and can therefore judge an erroneous wireless setting to an unintended communication equipment in case of receiving messages from plural communication equipment, thereby preventing an erroneous setting on the unintended equipment.

The present embodiment employs an infrared communication as the first communication means for transmission/reception of the parameters and a wireless LAN as the second communication means for realizing a direct print between the first communication equipment and the second communication equipment, but the present invention is not limited to such configuration and other wireless communication methods are also usable. Also the first communication equipment is not limited to a digital camera but can also be an equipment having image storage means and wireless communication means, such as a DVD player or a home server, and also the third communication equipment may be any equipment capable of communicating with the first and second communication equipment such as a remote control, a cellular phone, or an exclusive setting terminal.

Also in the wireless parameter generation in the third communication equipment, the present embodiment generates the parameter from the serial number, the current time and the like, but the present invention is not limited to such case and is applicable to any device or algorithm capable of generating a unique wireless parameter.

The object of the present invention can also be achieved by providing a storage medium storing program codes for performing the aforesaid processes to an image sensing system or apparatus, reading the program codes by a CPU or an MPU of the image reproduction apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical dis, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image reproduction apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image reproduction apparatus or in a memory provided in a function expansion unit which is connected to the image reproduction apparatus, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flow charts of FIGS. 8 and 9 or FIG. 11 described in the embodiments.

The present invention is so constructed that a communication parameter is transmitted to a first communication apparatus and a second communication apparatus, and a parameter indicating a file transfer job from the first communication apparatus to the second communication apparatus, it is rendered possible to set the communication parameter without requiring a particular manual input by the user, and, by transferring a parameter indicating a file transfer job, to realize a simple and easy file transfer system.

The present invention is not limited to the aforementioned embodiments but is subject to various modifications within the scope of the appended claims.

This application claims priority from Japanese Patent Application No. 2004-233748 filed Aug. 10, 2004, which is hereby incorporated by reference herein.

What is claimed is:

1. A communication control apparatus comprising:
   first transmission means which transmits a wireless communication parameter for executing direct communication between a first communication apparatus and a second communication apparatus, to the first communication apparatus;
   reception means which receives, from the first communication apparatus, a parameter indicating a file transfer job generated in advance to transmit files to the second communication apparatus from the first communication apparatus; and
   second transmission means which transmits the parameter indicating the file transfer job received by the reception means, and the wireless communication parameter, to the second communication apparatus before the first communication apparatus and the second communication apparatus communicate data directly to each other.

2. A communication control apparatus according to claim 1, further comprising:
   generation means which generates the wireless communication parameter to be transmitted by the first transmission means.

3. A communication control apparatus according to claim 1, further comprising:
   selection means which selects an image to be transferred from the first communication apparatus to the second communication apparatus;
   wherein the reception means receives, from the first communication apparatus, a file transfer job corresponding to a result of selection by the selection means.

4. A communication apparatus comprising:
   reception means which receives a wireless communication parameter for executing direct communication between said communication apparatus and a first communication apparatus, from a second communication apparatus;
   transmission means which transmits a parameter indicating a file transfer job generated in advance to transmit files to the first communication apparatus from said communication apparatus, to the second communication apparatus;
   connection request accepting means which accepts a connection request issued by the first communication apparatus to said communication apparatus, on the basis of the wireless communication parameter which the first communication apparatus receives from the second communication apparatus before the communication apparatus and the first communication apparatus communicate data directly to each other;
   job accepting means which receives a parameter received by the first communication apparatus from the second communication apparatus and indicating the file transfer job to be transmitted to said first communication apparatus; and
   job transfer means which transfers, to the first communication apparatus, a job corresponding to the parameter indicating the file transfer job received by the job accepting means.

5. A communication apparatus, comprising:
   reception means which receives, from a second communication apparatus, a wireless communication parameter for executing direct communication between said communication apparatus and a first communication apparatus, and a parameter transmitted from the first communication apparatus to the second communication apparatus and indicating a file transfer job generated in advance to transmit files to said communication apparatus from the first communication apparatus, wherein the second communication apparatus transmits a wireless communication parameter same as the wireless communication parameter transmitted to the communication apparatus, to the first communication apparatus before the communication apparatus and the first communication apparatus communicate data directly to each other;
   connection request issuing means which issues a connection request to the first communication apparatus on the basis of the wireless communication parameter;
   transmission means which transmits the parameter indicating the file transfer job to the first communication apparatus; and
   reception means which receives a job corresponding to the file transfer job from the first communication apparatus in response to a transmission of the parameter indicating the file transfer job.

6. A control method for a communication control apparatus comprising:
   a first transmission step of transmitting a wireless communication parameter for executing direct communication between a first communication apparatus and a second communication apparatus, to the first communication apparatus;
   a reception step of receiving, from the first communication apparatus, a parameter indicating a file transfer job generated in advance to transmit files to the second communication apparatus from the first communication apparatus; and
   a second transmission step of transmitting the parameter indicating the file transfer job received in the reception step, and the wireless communication parameter, to the second communication apparatus before the first communication apparatus and the second communication apparatus communicate data directly to each other.

7. A control method for a communication apparatus comprising:
   a reception step of receiving a wireless communication parameter for executing direct communication between said communication apparatus and a first communication apparatus, from a second communication apparatus;
   a transmission step of transmitting a parameter indicating a file transfer job generated in advance to transmit files to the first communication apparatus from said communication apparatus, to the second communication apparatus;
   a connection request accepting step of accepting a connection request issued by the first communication apparatus to said communication apparatus, on the basis of the wireless communication parameter which the first communication apparatus receives from the second communication apparatus before the communication apparatus and the first communication apparatus communicate data directly to each other;

a job accepting step of receiving a parameter received by the first communication apparatus from the second communication apparatus and indicating the file transfer job to be transmitted to said wireless communication apparatus; and a job transfer step of transferring, to the first communication apparatus, a job corresponding to the parameter indicating the file transfer job received in the job accepting step.

8. A control method for a communication apparatus, comprising:

a reception step of receiving, from a second communication apparatus, a wireless communication parameter for executing direct communication between said communication apparatus and a first communication apparatus, and a parameter transmitted from the first communication apparatus to the second communication apparatus and indicating a file transfer job generated in advance to transmit files to said communication apparatus from the first communication apparatus, wherein the second communication apparatus transmits a wireless communication parameter same as the wireless communication parameter transmitted to the communication apparatus, to the first communication apparatus before the communication apparatus and the first communication apparatus communicate data directly to each other on the basis of the wireless communication parameter received from the second communication apparatus;

a connection request issuing step of issuing a connection request to the first communication apparatus on the basis of the wireless communication parameter;

a transmission step of transmitting the parameter indicating the file transfer job to the first communication apparatus; and a reception step of receiving a job corresponding to the file transfer job from the first communication apparatus in response to a transmission of the parameter indicating the file transfer job.

* * * * *